United States Patent
Kawai et al.

(10) Patent No.: US 8,039,165 B2
(45) Date of Patent: Oct. 18, 2011

(54) PROTON CONDUCTIVE MEMBRANE COMPRISING A COPOLYMER

(75) Inventors: Junji Kawai, Tokyo (JP); Toru Shiibashi, Tokyo (JP); Kohei Goto, Tokyo (JP)

(73) Assignee: JSR Corporation, Tokyo (JP)

( * ) Notice: Subject to any disclaimer, the term of this patent is extended or adjusted under 35 U.S.C. 154(b) by 239 days.

(21) Appl. No.: 10/582,518

(22) PCT Filed: Dec. 8, 2004

(86) PCT No.: PCT/JP2004/018292
§ 371 (c)(1),
(2), (4) Date: Jun. 9, 2006

(87) PCT Pub. No.: WO2005/056650
PCT Pub. Date: Jun. 23, 2005

(65) Prior Publication Data
US 2007/0111071 A1      May 17, 2007

(30) Foreign Application Priority Data

Dec. 9, 2003   (JP) ................... 2003-410668

(51) Int. Cl.
*H01M 8/10* (2006.01)
(52) U.S. Cl. ......... 429/492; 429/491; 525/242; 528/170
(58) Field of Classification Search ............ 429/33, 429/491, 492; 525/242; 528/170
See application file for complete search history.

(56) References Cited

U.S. PATENT DOCUMENTS

| | | | |
|---|---|---|---|
| 2001/0041279 A1* | 11/2001 | Terahara et al. | 429/33 |
| 2002/0091225 A1* | 7/2002 | McGrath et al. | 528/170 |
| 2003/0195301 A1* | 10/2003 | Goto et al. | 525/242 |

FOREIGN PATENT DOCUMENTS

| | | |
|---|---|---|
| JP | 02-000159 | 1/1990 |
| JP | 5-1149 | 1/1993 |
| JP | 2001-250567 | 9/2001 |
| JP | 2003-31232 | 1/2003 |
| JP | 2003-113136 | 4/2003 |
| JP | 2003-142125 | 5/2003 |
| JP | 2003-331868 | 11/2003 |
| JP | 2004-175997 | 6/2004 |
| JP | 2005-19055 | 1/2005 |
| WO | 95/32236 | 11/1995 |
| WO | 02/080294 | 10/2002 |
| WO | 02/101860 | 12/2002 |
| WO | WO 03/095509 | 11/2003 |

OTHER PUBLICATIONS

U.S. Appl. No. 10/582,080, filed Jun. 8, 2006, Kawai, et al.
Kobayashi, Takeshi et al.,"Preparation of Thermally Stable Proton Conducting Polymer", Polymer Preprints, vol. 42, No. 7, pp. 2490-2493, 1993. (With English translation).
Kobayashi, Takeshi et al.,"Preparation of Thermally Stable Proton Conducting Polymer", Polymer Preprints, vol. 43, No. 3, pp. 736-737, 1994. (With English Translation).
Kobayashi, Takeshi et al.,"Preparation of Thermally Stable Proton Conducting Polymer", Polymer Preprints, vol. 42, No. 3, pp. 730-731, 1993. (With English Translation).
Kim, et al., State of Water in Disulfonated Poly (arylene ether sulfone) Copolymers and a Perfluorosulfonic Add Copolymer (Nation) and Its Effect on Physical and Electrochemical Properties, Macromolecules, American Chemical Society, vol. 36, No. 17, pp. 6281-6285, Aug. 26, 2003.
Lafitte, et al., Sulfophenylation of Polysulfones for Proton-Conducting Fuel Cell Membranes, Macromolecular Rapid Communications, WILEY-VCH Verlage GmbH & Co. KGaA, vol. 23, pp. 896-900, Oct. 31, 2002.
Office Action issued Oct. 5, 2010, in Japanese Patent Application No. 2004-355676, filed Dec. 8, 2004.

* cited by examiner

*Primary Examiner* — Barbara Gilliam
*Assistant Examiner* — Zachary Best
(74) *Attorney, Agent, or Firm* — Oblon, Spivak, McClelland, Maier & Neustadt, L.L.P.

(57) ABSTRACT

A proton conductive membrane capable of sufficient proton conductivity even at low humidities and low temperatures is provided. The proton conductive membrane includes a copolymer including an ion conductive polymer segment (A) and an ion nonconductive polymer segment (B), the membrane absorbing water when it is soaked in 90° C. water for 30 minutes of which the quantity of water showing freezing temperatures in the range of −30 to 0° C. is 0.01 to 3.0 g based on 1 g of the copolymer. The copolymer has a structure in which main chain skeletons of the copolymer are covalently bound at aromatic rings thereof through binding groups.

2 Claims, No Drawings

PROTON CONDUCTIVE MEMBRANE COMPRISING A COPOLYMER

FIELD OF THE INVENTION

The present invention relates to a proton conductive membrane suitable for use as electrolytes in solid polymer fuel cells.

BACKGROUND ART

A fuel cell essentially consists of two catalyst electrodes and a solid electrolyte membrane sandwiched between the electrodes. Hydrogen, the fuel, is ionized at one of the electrodes, and the hydrogen ions diffuse through the solid electrolyte membrane and combine with oxygen at the other electrode. When the two electrodes are connected through an external circuit, an electric current flows and electric power is supplied to the external circuit. Here, the solid electrolyte membrane has functions to diffuse the hydrogen ions, as well as to physically isolate the fuel gas (hydrogen) and oxygen and to block the flow of electrons.

It is accepted that the solid electrolyte membranes diffuse hydrogen ions through water clusters in hydrophilic channels (ion conducting channels). Therefore, the ion conductivity drastically lowers at low humidities by drying of water and at low temperatures by freezing of water. The quantity of water adsorbed and bound to ion conductive groups in the membrane and the channel structure formed by the ion conductive groups are considered very important for the ion conductivity.

The present inventors studied in view of the above problems in the background art and have arrived at a solid polymer electrolyte membrane that comprises an ion conductive polymer segment (A) and an ion nonconductive polymer segment (B), wherein ion conductive groups adsorb water of which a sufficient quantity shows melting temperatures in the range of −30 to 0° C., whereby water is prevented from drying at low humidities and from freezing at low temperatures and consequently the membrane can achieve sufficient proton conductivity even at low humidities and low temperatures. It has also been found that when the solid polymer electrolyte membrane has a morphology in which the ion conductive polymer segment (A) forms a continuous phase, the membrane achieves a sufficient quantity of water showing melting temperatures of −30 to 0° C.

DISCLOSURE OF THE INVENTION

Problems to be Solved by the Invention

It is an object of the present invention to provide a proton conductive membrane capable of sufficient proton conductivity even at low humidities and low temperatures.

Means For Solving The Problems

The invention provides the following proton conductive membranes and the above object is achieved.

(1) A proton conductive membrane comprising a copolymer comprising an ion conductive polymer segment (A) and an ion nonconductive polymer segment (B), the membrane absorbing water when it is soaked in 90° C. water for 30 minutes of which the quantity of water showing melting temperatures in the range of −30 to 0° C. is 0.01 to 3.0 g based on 1 g of the copolymer.

(2) The proton conductive membrane as described in (1), wherein the copolymer has a morphology in which the ion conductive polymer segment (A) forms a continuous phase.

(3) The proton conductive membrane as described in (1) or (2), wherein the copolymer is a block copolymer in which the ion conductive polymer segment (A) and the ion nonconductive polymer segment (B) are covalently bound.

(4) The proton conductive membrane as described in any one of (1) to (3), wherein the copolymer has a structure in which main chain skeletons of the copolymer are covalently bound at aromatic rings thereof through binding groups.

(5) The proton conductive membrane as described in any one of (1) to (4), wherein the ion conductive polymer segment (A) and the ion nonconductive polymer segment (B) comprise repeating structural units represented by Formulae (A) and (B), respectively:

[Chem. 1]

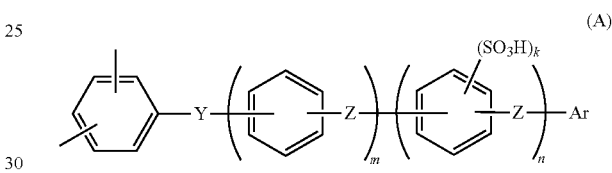

wherein Y is a divalent electron-withdrawing group; Z is a divalent electron-donating group or a direct bond; Ar is an aromatic group having a substituent —SO$_3$H; m is an integer ranging from 0 to 10; n is an integer ranging from 0 to 10; and k is an integer ranging from 1 to 4;

[Chem. 2]

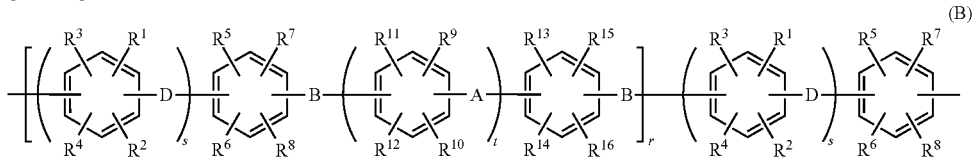

wherein A and D are the same or different and are each a direct bond or at least one structure selected from the group consisting of —CO—, —SO$_2$—, —SO—, —CONH—, —COO—, —(CF$_2$)$_l$— (where l is an integer ranging from 1 to 10), —(CH$_2$)$_l$— (where l is an integer ranging from 1 to 10), —C(R')$_2$— (where R' is an alkyl group, a fluoroalkyl group or an aryl group), —O—, —S—, cyclohexylidene group and fluorenylidene group; B's are the same or different and are each an oxygen or a sulfur atom; R$^1$ to R$^{16}$ are the same or different from one another and are each at least one atom or group selected from the group consisting of a hydrogen atom, a fluorine atom, alkyl groups, partially or fully halogenated alkyl groups, allyl groups, aryl groups, nitro group and nitrile group; s and t are the same or different and are each an integer ranging from 0 to 4; and r is an integer of 0 or 1 or greater.

EFFECT OF THE INVENTION

The proton conductive membrane according to the present invention can achieve sufficient proton conductivity even at low humidities and low temperatures.

DESCRIPTION OF THE PREFERRED EMBODIMENTS

The proton conductive membrane according to the present invention will be described in detail hereinbelow.

The proton conductive membrane comprises a copolymer comprising an ion conductive polymer segment (A) with ion conductive groups and an ion nonconductive polymer segment (B) without ion conductive groups, and the membrane absorbs water when it is soaked in 90° C. water for 30 minutes of which the quantity of water showing melting temperatures in the range of −30 to 0° C. is 0.01 to 3.0 g based on 1 g of the copolymer.

(Water Showing Melting Temperatures of −30 to 0° C.)

The water adsorbed in the membrane generally includes unfreezable water, water showing melting temperatures of not more than 0° C., and free water. The unfreezable water is considered to bind to the ion conductive polymer segment with strong interaction. The water showing melting temperatures of not more than 0° C. probably binds to the ion conductive polymer segment with weak interaction, or binds to the unfreezable water with weak interaction. The free water is considered to have no interaction with the ion conductive groups. Accordingly, increasing the unfreezable water and the water showing melting temperatures of not more than 0° C. will enhance the proton conductivity at low humidities and low temperatures. However, the adsorption of unfreezable water greatly depends on the polymer's ion exchange capacity, and the membrane material is very limited. The adsorption of water showing melting temperatures of not more than 0° C. is highly susceptible to the arrangement (morphology) of ion conductive groups in the membrane and is therefore easy to control.

The proton conductive membrane absorbs water when it is soaked in 90° C. water for 30 minutes of which the quantity of water showing melting temperatures in the range of −30 to 0° C. is 0.01 to 3.0 g, preferably 0.1 to 2.0 g based on 1 g of the polymer.

When the proton conductive membrane includes the above quantity of water showing melting temperatures of −30 to 0° C., the interaction of the water with the ion conductive groups prevents the water from drying at low humidities and from freezing at low temperatures, whereby the membrane can exhibit sufficient proton conductivity even at low humidities and low temperatures. When the quantity of such water is less than described above, the water adsorbed to the ion conductive groups is so small that the membrane often fails to achieve sufficient ion conductivity. A quantity of such water exceeding the above range leads to great swelling of the proton conductive membrane and consequent drastic dimensional change. Consequently, the operation of a fuel cell tends to result in separation of the membrane from the electrode layers and cracks in the electrode layers.

The water showing melting temperatures in the range of −30 to 0° C. is determined as follows. The proton conductive membrane is soaked in 90° C. water for 30 minutes and taken out. The membrane is cooled to −100° C. and then heated to 200° C. each at 5° C./min using a differential scanning calorimeter (Thermal Analyst 2000 manufactured by DuPont Instruments). The areas of the peaks due to the melting of water are obtained to determine the heat of melting, and the quantity of water showing melting temperatures in the range of −30 to 0° C. per g of the polymer is obtained. That is, the quantity of water showing melting temperatures of −30 to 0° C. is obtained from the melting peaks observed in the range of −30 to 0° C. according to differential scanning calorimetry.

(Morphology)

In the proton conductive membrane of the invention, the copolymer has a morphology in which the ion conductive polymer segment (A) (hereinafter, the segment (A)) forms a continuous phase, preferably an isotropic continuous phase. Also preferably, the ion nonconductive polymer segment (B) (hereinafter, the segment (B)) forms a non-continuous phase, more preferably a structure similar to a dispersed phase. The long period of the structure is preferably in the range of 1 nm to 200 nm, more preferably 1 nm to 100 nm.

When the segment (A) forms a continuous phase in the copolymer, ion channels made up of the segment (A) are arranged uniformly through the proton conductive membrane, and the ion conductive groups adsorb and bind thereto increased amounts of water. Consequently, water is prevented from drying at low humidities and from freezing at low temperatures and the proton conductive membrane can achieve sufficient proton conductivity even at low humidities and low temperatures.

If the segment (A) forms a non-continuous phase, uniform arrangement of the segment (A) through the membrane is not ensured and the water adsorbed and bound to the segment (A) is reduced. Consequently, the proton conductive membrane fails to achieve sufficient proton conductivity at low humidities and low temperatures.

The copolymer of the segments (A) and (B) is preferably a block copolymer in which the segments (A) and (B) are covalently bound, and is more preferably a block copolymer in which the segments (A) and (B) are covalently bound in a manner such that main chain skeletons making up the copolymer are covalently bound at aromatic rings thereof through binding groups.

Preferred examples of the ion conductive groups include sulfonic acid group.

The copolymer for the proton conductive membrane is preferably a polyarylene having a sulfonic acid group that includes repeating structural units represented by Formula (A) (segment A) and repeating structural units represented by Formula (B) (segment B). For example, a polyarylene having a sulfonic acid group that is represented by Formula (C) below is preferable. The use of the copolymer represented by Formula (C) leads to increased water resistance and mechanical strength, and also higher ion exchange capacity. Consequently, the water showing melting temperatures of −30 to 0° C. is increased and the proton conductivity is enhanced.

(Polyarylene Having a Sulfonic Acid Group)

The polyarylene having a sulfonic acid group that is suitably used in the invention includes repeating structural units represented by Formulae (A) and (B) below.

[Chem. 3]

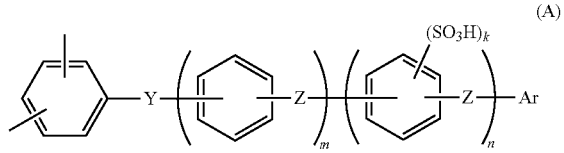

(A)

In Formula (A), Y is a divalent electron-withdrawing group such as —CO—, —SO$_2$—, —SO—, —CONH—, —COO—, —(CF$_2$)$_l$— (where l is an integer of from 1 to 10) and —C(CF$_3$)$_2$—; and Z is a direct bond or a divalent electron-donating group such as —(CH$_2$)—; —C(CH$_3$)$_2$—, —O—, —S—, —CH=CH—, —C≡C— and groups represented by:

[Chem. 4]

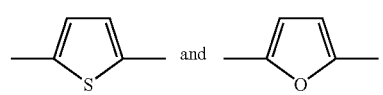

The electron-withdrawing group is defined as having a Hammett substituent constant of not less than 0.06 at the m-position of the phenyl group and not less than 0.01 at the p-position.

Ar denotes an aromatic group with a substituent —SO$_3$H. Exemplary aromatic groups include phenyl, naphthyl, anthracenyl and phenanthyl groups, with phenyl and naphthyl groups being preferred.

In the above formula, m is an integer of from 0 to 10, preferably from 0 to 2; n is an integer of from 0 to 10, preferably from 0 to 2; and k is an integer of from 1 to 4.

[Chem. 5]

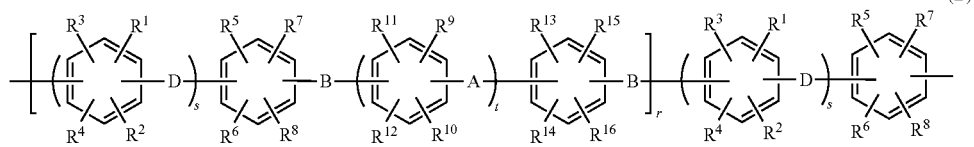

(B)

In Formula (B), A and D are the same or different and are each a direct bond or at least one structure selected from the group consisting of —CO—, —SO$_2$—, —SO—, —CONH—, —COO—, —(CF$_2$)$_l$— (where l is an integer ranging from 1 to 10), —(CH$_2$)$_l$— (where l is an integer ranging from 1 to 10), —C(R')$_2$— (where R' is an alkyl group, a fluoroalkyl group or an aryl group), —O—, —S—, cyclohexylidene group and fluorenylidene group. Examples of R' in the structure —C(R')$_2$— include alkyl groups such as methyl, ethyl and propyl groups, fluoroalkyl groups such as trifluoromethyl and heptafluoroethyl groups, and aryl groups such as phenyl and naphthyl groups. Specific examples of the structures —C(R')$_2$— include —C(CF$_3$)$_2$—, —C(CH$_3$)$_2$— and —C(C$_6$H$_5$)$_2$—.

Of the above structures, direct bond, —CO—, —SO$_2$—, —C(R')$_2$— (where R' is an alkyl, fluoroalkyl or aryl group), —O—, cyclohexylidene group and fluorenylidene group are preferred.

B's are the same or different and are each an oxygen or a sulfur atom, preferably an oxygen atom.

$R^1$ to $R^{16}$ are the same or different from one another and are each at least one atom or group selected from the group consisting of a hydrogen atom, a fluorine atom, alkyl groups, partially or fully halogenated alkyl groups, allyl groups, aryl groups, nitro group and nitrile group.

The alkyl groups include methyl, ethyl, propyl, butyl, amyl, hexyl, cyclohexyl and octyl groups. The halogenated alkyl groups include trifluoromethyl, pentafluoroethyl, perfluoropropyl, perfluorobutyl, perfluoropentyl and perfluorohexyl groups. The allyl groups include propenyl group. The aryl groups include phenyl and pentafluorophenyl groups.

The letters s and t are the same or different and are each an integer ranging from 0 to 4.

The letter r is an integer of 0 or 1 or greater generally up to 100, preferably in the range of 1 to 80.

Preferred examples of the structural units with combinations of s, t, A, B, D and $R^1$ to $R^{16}$ include:

(1) structural units in which s is 1; t is 1; A is —C(R')$_2$— (where R' is an alkyl, fluoroalkyl or aryl group), cyclohexylidene group or fluorenylidene group; B is an oxygen atom; D is —CO— or —SO$_2$—; and $R^1$ to $R^{16}$ are each a hydrogen atom or a fluorine atom;

(2) structural units in which s is 1; t is 0; B is an oxygen atom; D is —CO— or —SO$_2$—; and $R^1$ to $R^{16}$ are each a hydrogen atom or a fluorine atom; and (3) structural units in which s is 0; t is 1; A is —C(R')$_2$— (where R' is an alkyl, fluoroalkyl or aryl group), cyclohexylidene group or fluorenylidene group; B is an oxygen atom; and $R^1$ to $R^{16}$ are each a hydrogen atom, a fluorine atom or a nitrile group.

Specifically, the polyarylene having a sulfonic acid group is a polymer represented by Formula (C) below:

[Chem. 6]

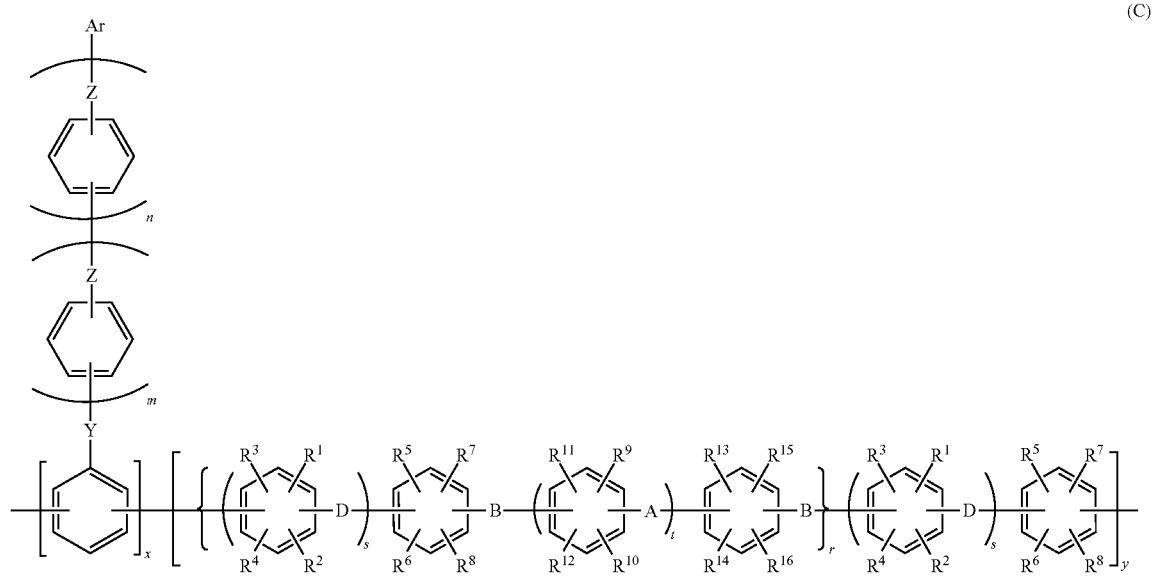

(C)

wherein A, B, D, Y, Z, Ar, k, m, n, r, s, t and $R^1$ to $R^{16}$ are the same as A, B, D, Y, Z, Ar, k, m, n, r, s, t and $R^1$ to $R^{16}$ in Formulae (A) and (B), and x and y each indicate a molar proportion of which the total x+y is 100 mol %.

The polyarylene having a sulfonic acid group contains 0.5 to 100 mol %, preferably 10 to 99.999 mol % the repeating structural units of Formula (A) (namely, the units "x"), and 99.5 to 0 mol %, preferably 90 to 0.001 mol % the repeating structural units of Formula (B) (namely, the units "y").
(Production of Polyarylene Having Sulfonic Acid Group)

The polyarylene having a sulfonic acid group may be synthesized by copolymerizing a monomer which has a sulfonate group and is capable of forming the structural units of Formula (A) with an oligomer capable of forming the structural units of Formula (B) to produce a polyarylene having a sulfonate group, and hydrolyzing the polyarylene to convert the sulfonate group into the sulfonic acid group.

Alternatively, a polyarylene is previously synthesized which includes structural units with a skeleton represented by Formula (A) except that the structural units have no sulfonic acid or sulfonate groups, and the structural units represented by Formula (B); and the polyarylene is sulfonated to synthesize the polyarylene having a sulfonic acid group.

When the monomer capable of forming the structural units of Formula (A) is copolymerized with the oligomer capable of forming the structural units of Formula (B) to synthesize the polyarylene having a sulfonate group, the monomer capable of forming the structural units of Formula (A) is for example a sulfonate represented by Formula (D) below (hereinafter, the monomer (D)):

[Chem. 7]

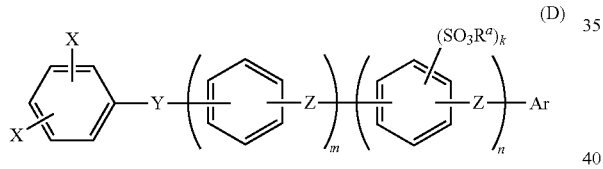

(D)

In Formula (D), X denotes a halogen atom other than fluorine (i.e., chlorine, bromine or iodine) or a —OSO$_2$Z group (where Z is an alkyl, fluorine-substituted alkyl or aryl group); and Y, Z, m, n and k are as described in Formula (A).

$R^a$ denotes a hydrocarbon group of 1 to 20, preferably 4 to 20 carbon atoms. Specific examples thereof include linear hydrocarbon groups, branched hydrocarbon groups, alicyclic hydrocarbon groups and 5-membered heterocyclic hydrocarbon groups, such as methyl, ethyl, n-propyl, iso-propyl, tert-butyl, iso-butyl, n-butyl, sec-butyl, neopentyl, cyclopentyl, hexyl, cyclohexyl, cyclopentylmethyl, cyclohexylmethyl, adamantyl, adamantanemethyl, 2-ethylhexyl, bicyclo[2.2.1]heptyl, bicyclo[2.2.1]heptylmethyl, tetrahydrofurfuryl, 2-methylbutyl, 3,3-dimethyl-2,4-dioxolanemethyl, cyclohexylmethyl, adamantylmethyl and bicyclo[2.2.1]heptylmethyl groups. Of these, n-butyl, neopentyl, tetrahydrofurfuryl, cyclopentyl, cyclohexyl, cyclohexylmethyl, adamantylmethyl and bicyclo[2.2.1]heptylmethyl groups are preferred, and neopentyl group is more preferable.

Ar' denotes an aromatic group with a sulfonate —SO$_3$R$^b$. Exemplary aromatic groups include phenyl, naphthyl, anthracenyl and phenanthyl groups, with phenyl and naphthyl groups being preferred. The aromatic group is substituted with one or two or more sulfonates —SO$_3$R$^b$. When two or more substituents —SO$_3$R$^b$ are present, they may be the same as or different from one another.

$R^b$ denotes a hydrocarbon group of 1 to 20, preferably 4 to 20 carbon atoms. Specific examples thereof include the above-described hydrocarbon groups having 1 to 20 carbon atoms. Of such groups, n-butyl, neopentyl, tetrahydrofurfuryl, cyclopentyl, cyclohexyl, cyclohexylmethyl, adamantylmethyl and bicyclo[2.2.1]heptylmethyl groups are preferred, and neopentyl group is more preferable.

Specific examples of the sulfonates represented by Formula (D) include the following compounds:

[Chem. 8]

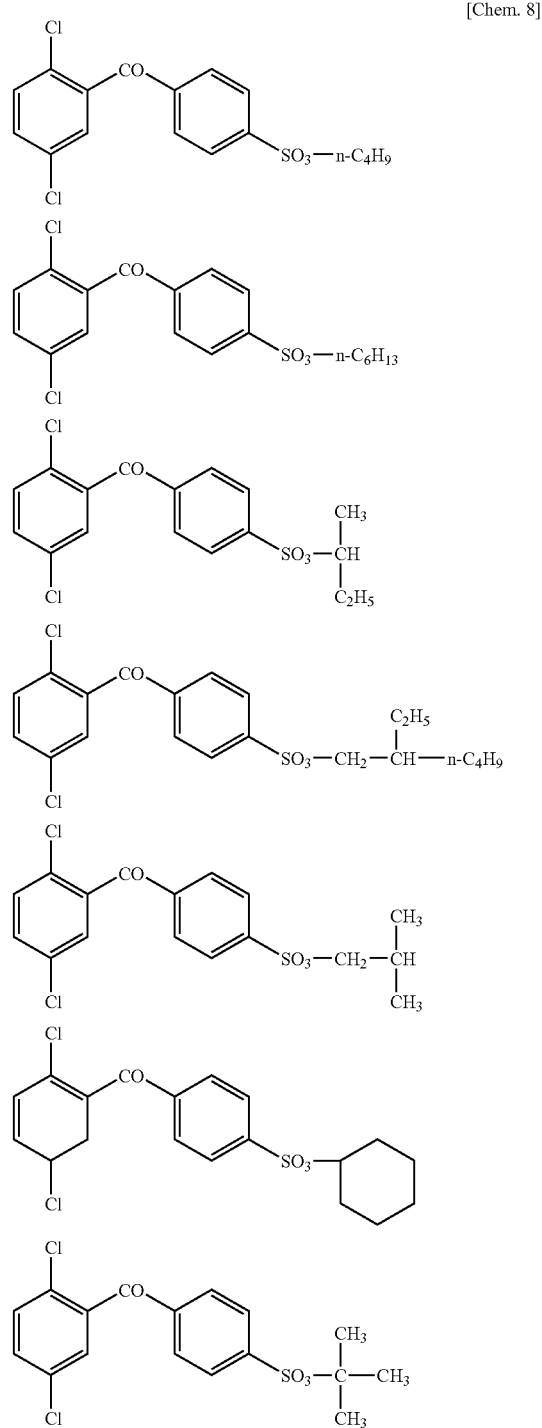

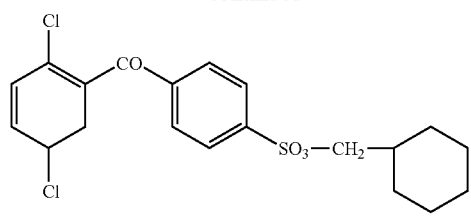
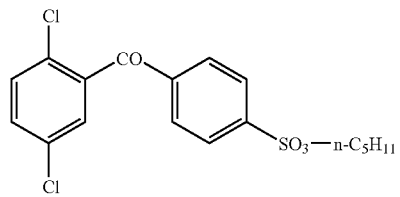
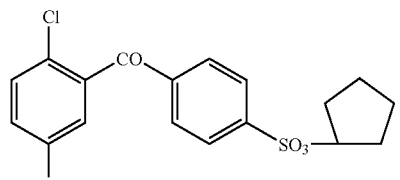
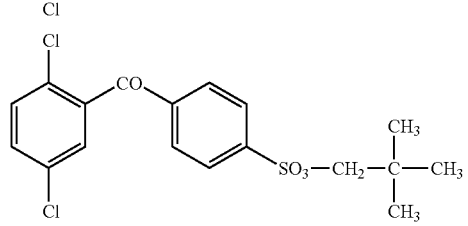
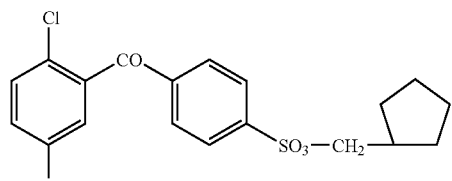
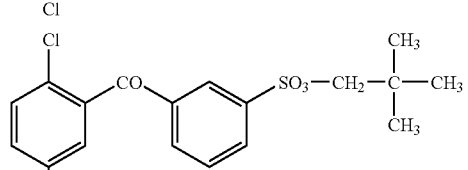
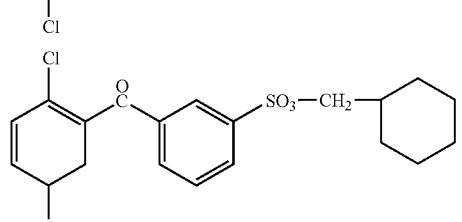
[Chem. 9]
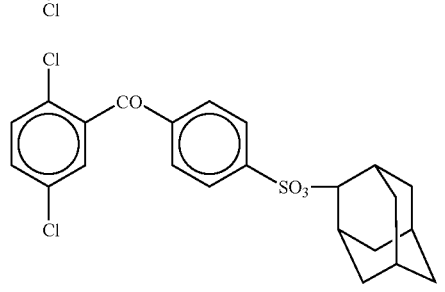
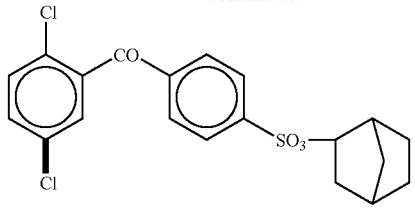
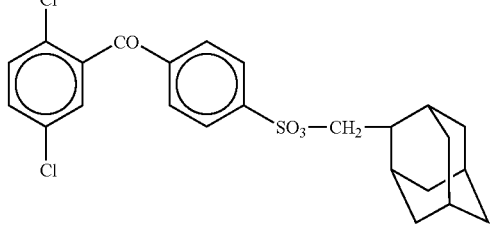
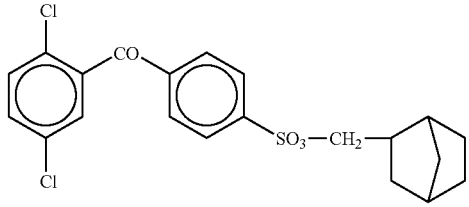
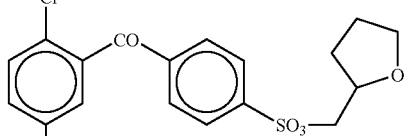
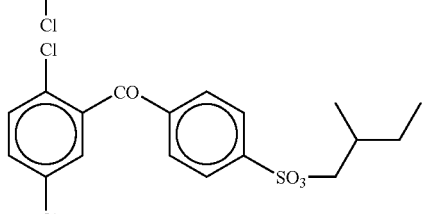
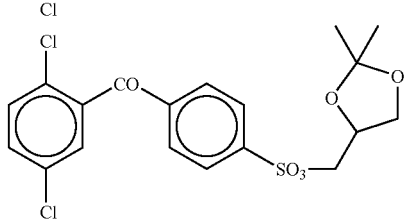
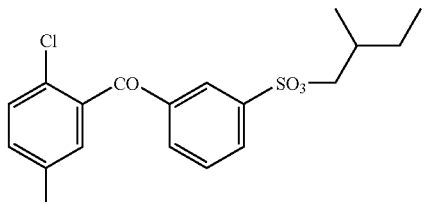
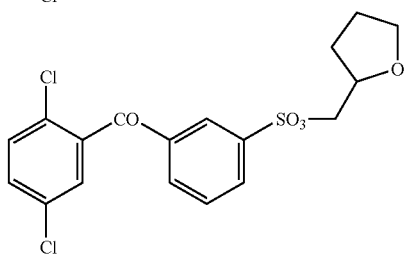

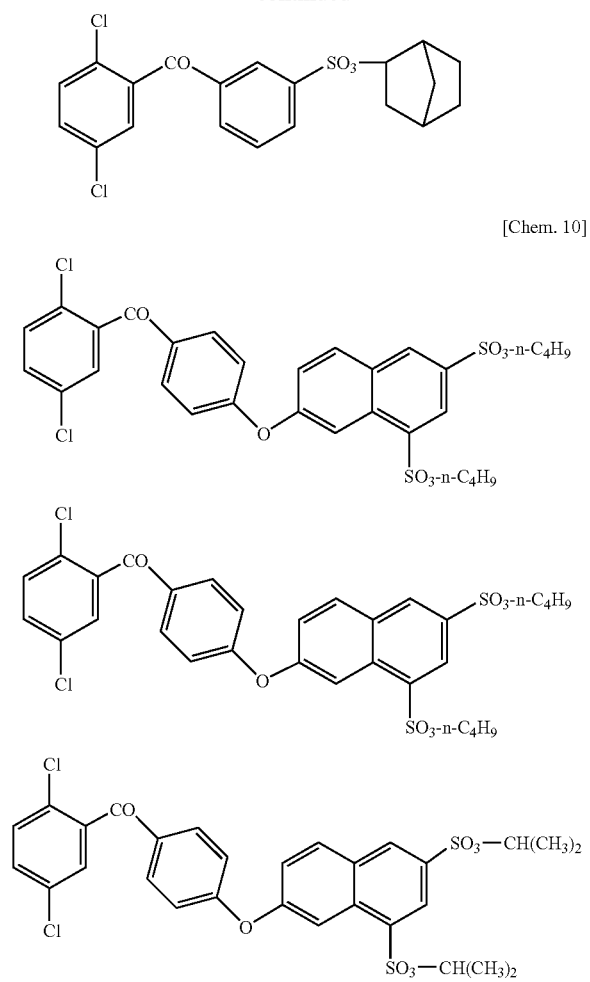
[Chem. 10]
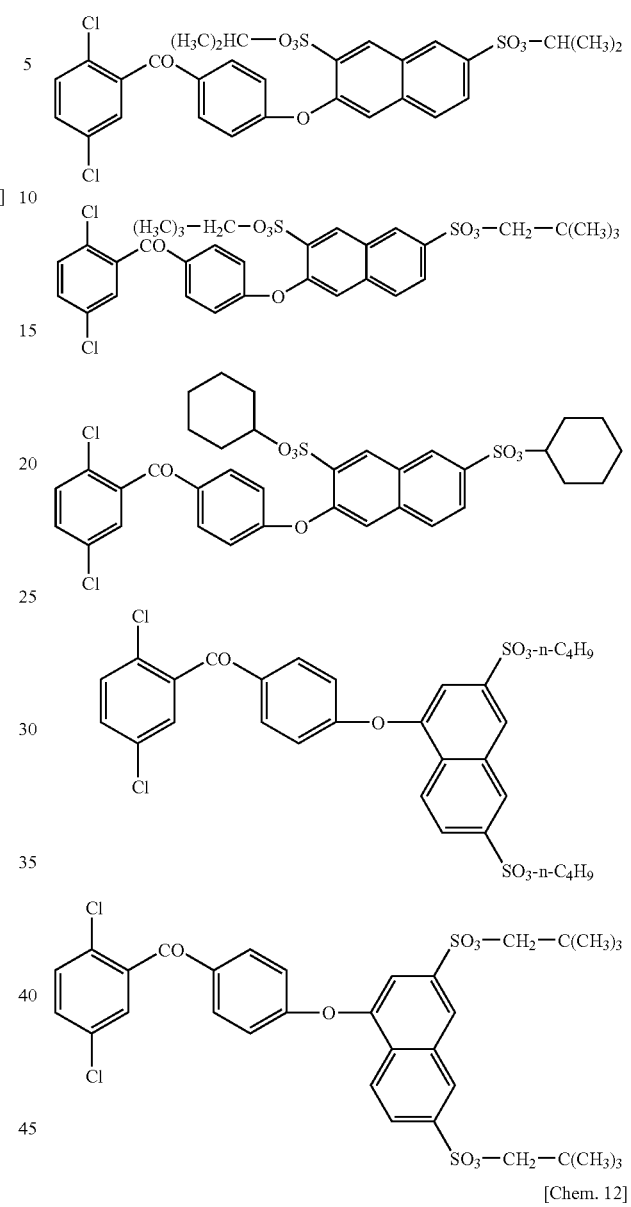
[Chem. 12]
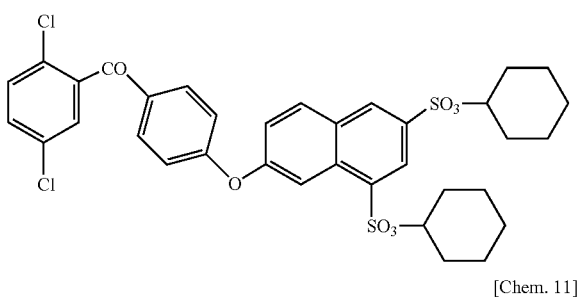
[Chem. 11]
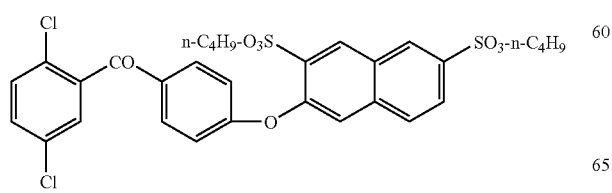
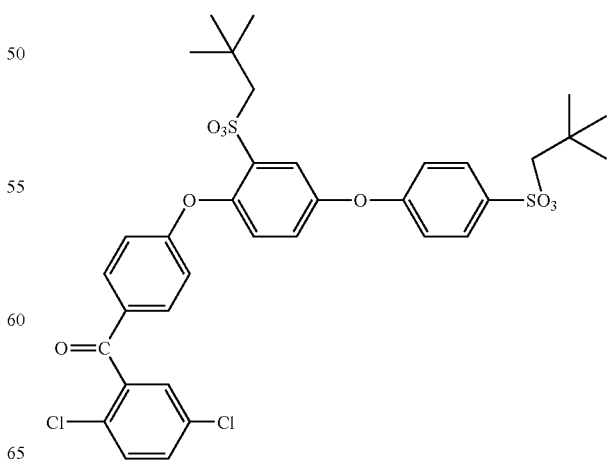

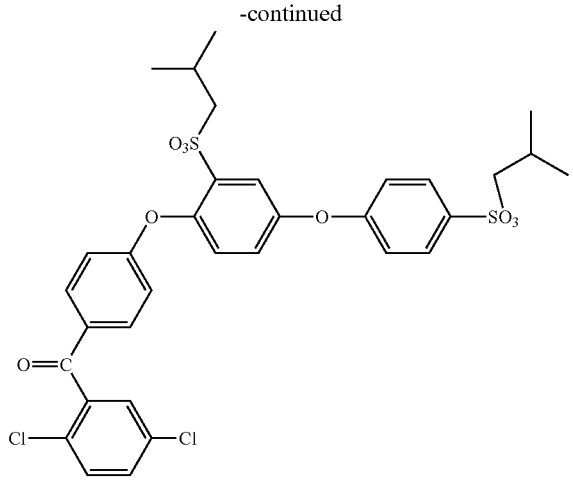
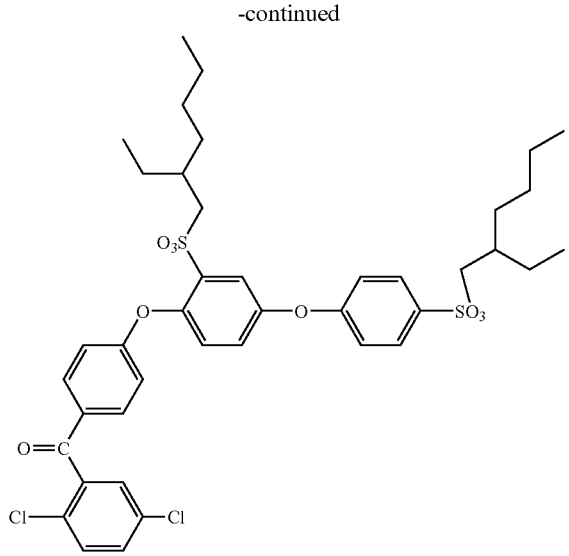
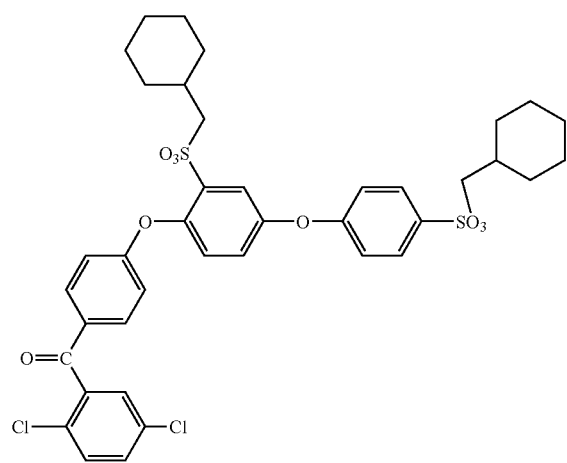
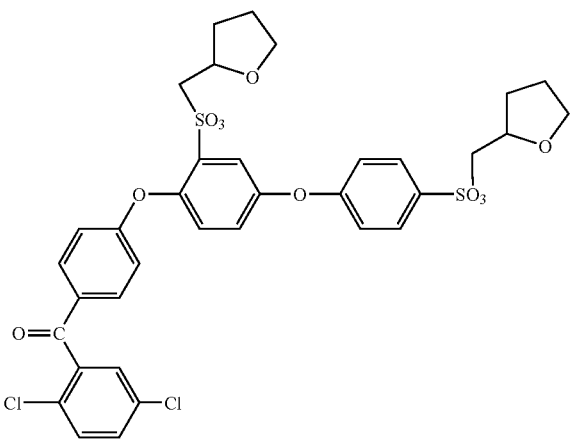
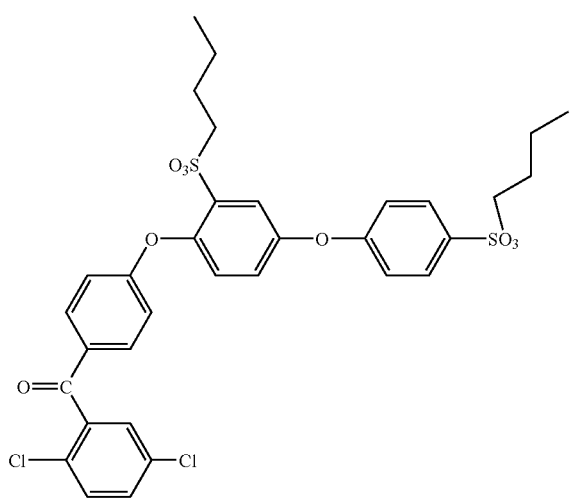
[Chem. 13]
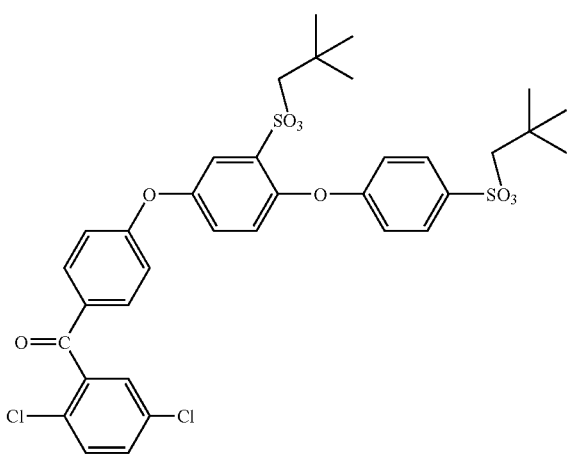

15
-continued
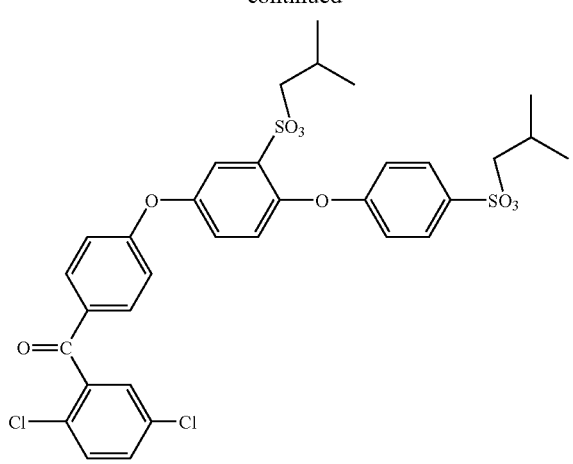
16
-continued
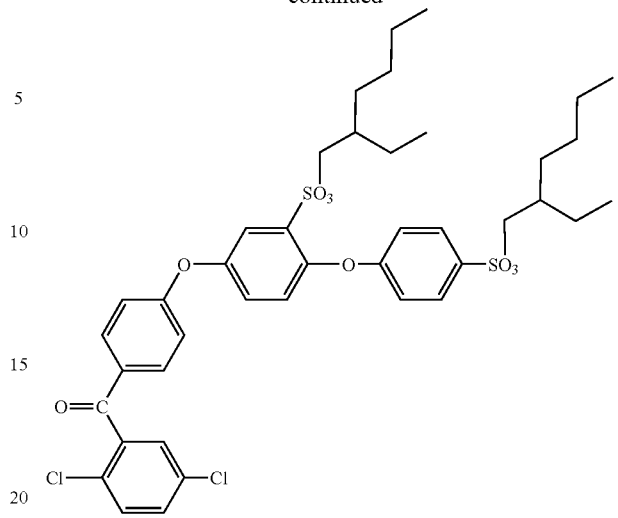
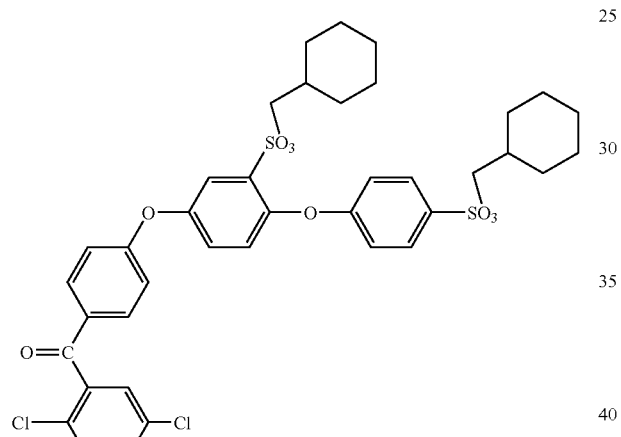
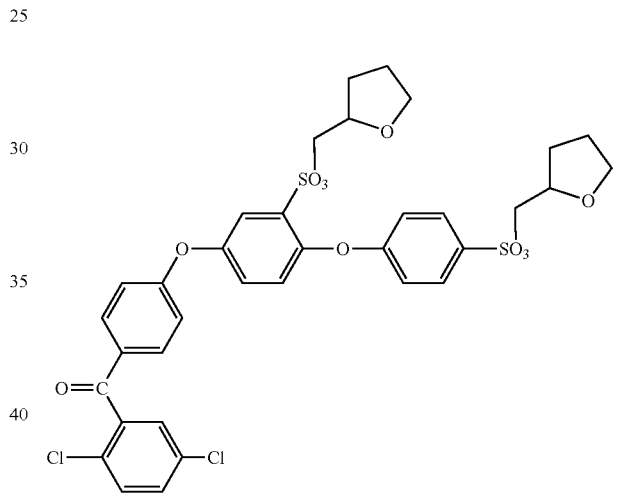
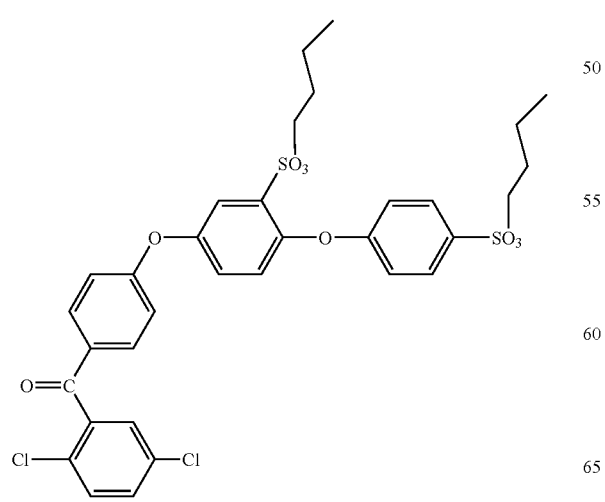
[Chem. 14]
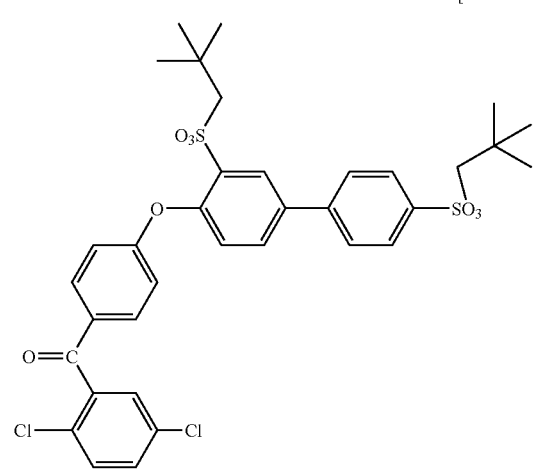

17
-continued
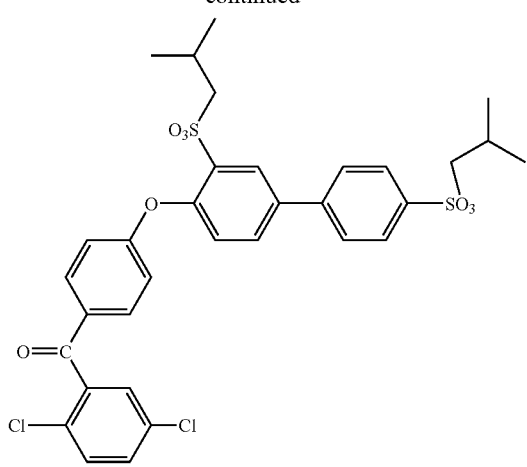
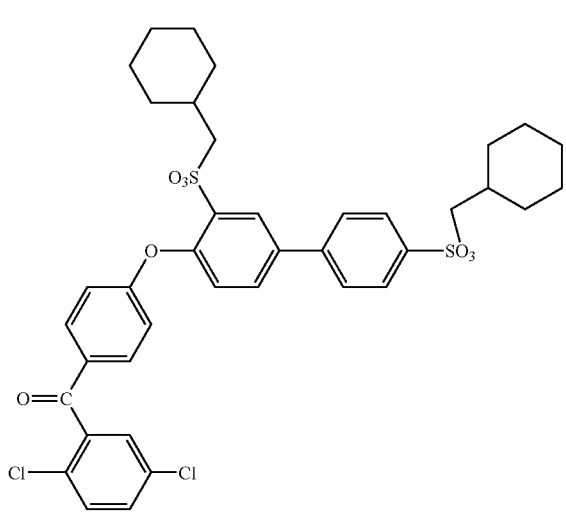
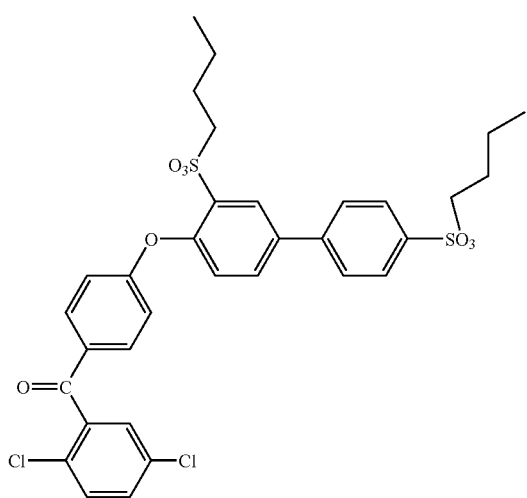
18
-continued
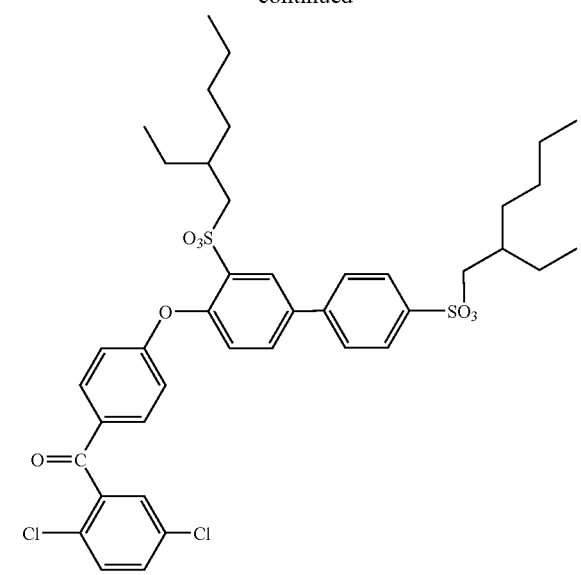
[Chem. 15]
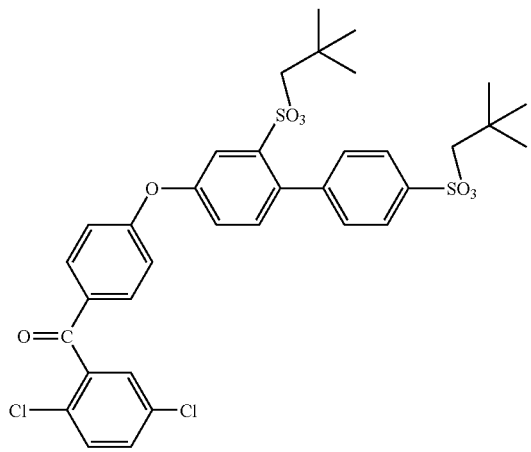

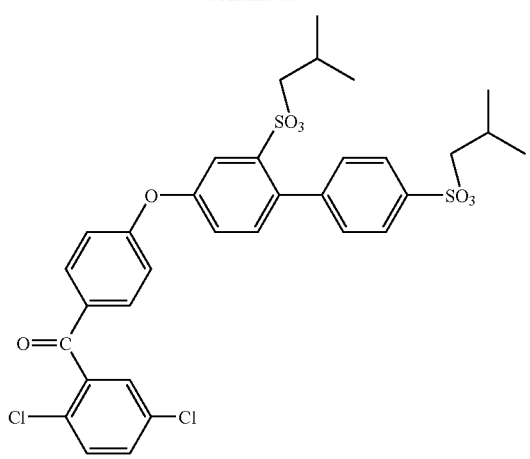

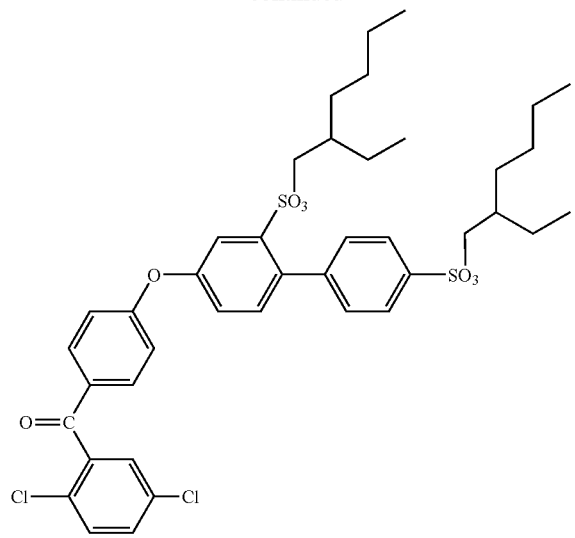

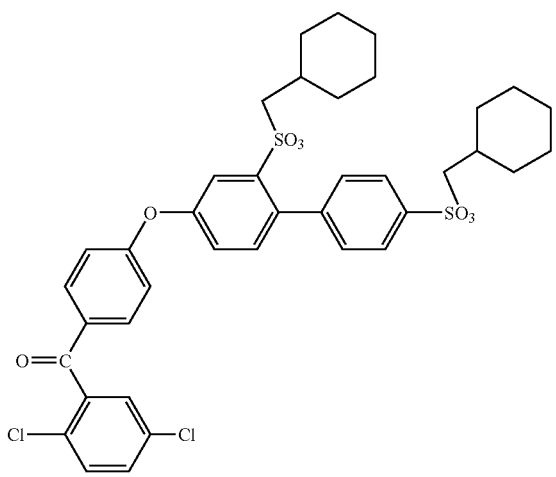

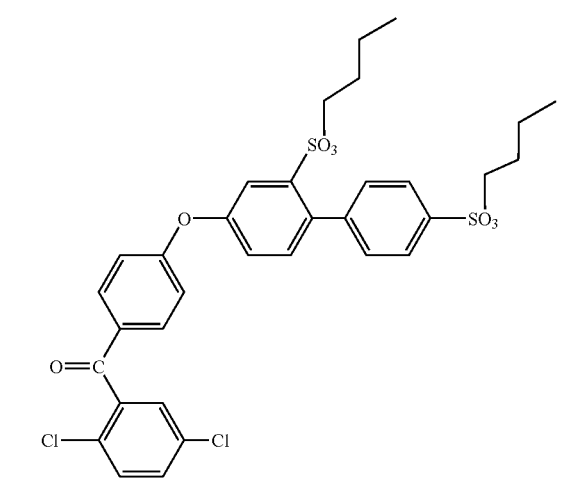

Also employable are sulfonate derivatives derived from the compounds of Formula (D), in which the chlorine atoms are replaced by bromine atoms, in which —CO— is replaced by —SO$_2$—, and in which the chlorine atoms are replaced by bromine atoms and —CO— is replaced by —SO$_2$—.

The R$^b$ group in Formula (D) is preferably derived from a primary alcohol, and the β carbon atom is preferably tertiary or quaternary. More preferably, such ester group is derived from a primary alcohol and the β carbon atom is quaternary. When these two conditions are satisfied, excellent stability may be obtained during polymerization and no inhibited polymerization or crosslinking will result from the formation of sulfonic acids by deesterification.

The compounds having a skeleton similar to that of the sulfonates of Formula (D) except that the compounds have no sulfonic acid or sulfonate groups include the following compounds:

[Chem. 16]

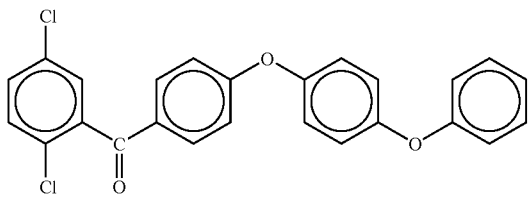

[Chem. 17]

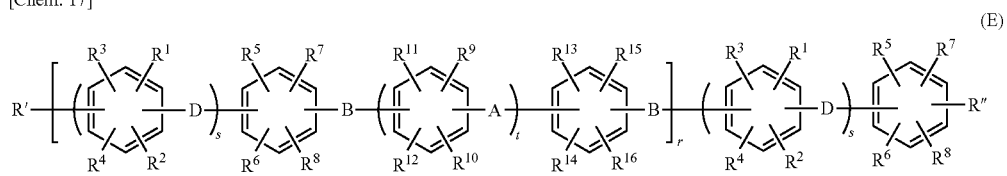

-continued

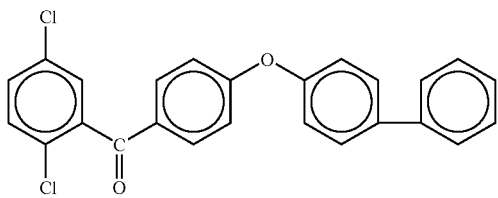

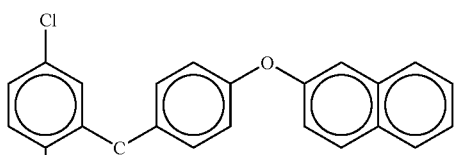

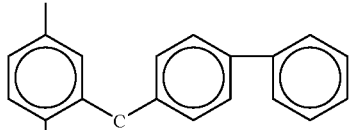

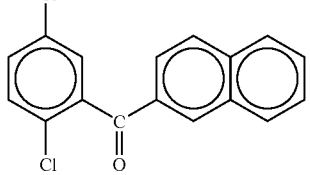

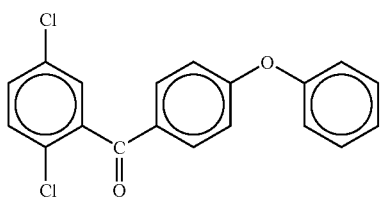

Also employable are derivatives of the above compounds in which the chlorine atoms are replaced by bromine atoms, in which —CO— is replaced by —SO$_2$—, and in which the chlorine atoms are replaced by bromine atoms and —CO— is replaced by —SO$_2$—.

Examples of the oligomers capable of forming the structural units of Formula (B) include compounds represented by Formula (E) below (hereinafter, the oligomers (E)):

In Formula (E), R' and R" are the same or different and are each a halogen atom other than fluorine or a —OSO$_2$Z group (where Z is an alkyl, fluorine-substituted alkyl or aryl group) Indicated by Z, the alkyl groups include methyl and ethyl groups, the fluorine-substituted alkyl groups include trifluoromethyl group, and the aryl groups include phenyl and p-tolyl groups.

In Formula (E), A, D, B, R$^1$ to R$^{16}$, r, s and t are as defined in Formula (B).

Preferred examples of the compounds with combinations of s, t, A, B, D and R$^1$ to R$^{16}$ are as described with respect to Formula (B).

Specific examples of the compounds having Formula (E) in which r is 0 include 4,4'-dichlorobenzophenone, 4,4'-dichlorobenzanilide, bis(chlorophenyl)difluoromethane, 2,2-bis(4-chlorophenyl)hexafluoropropane, 4-chlorobenzoic acid-4-chlorophenyl, bis(4-chlorophenyl)sulfoxide, bis(4-chlorophenyl)sulfone, 2,6-dichlorobenzonitrile, 9,9-bis(4-hydroxyphenyl)fluorene, derivatives of these compounds in which the chlorine atom is replaced by a bromine or an iodine atom, and derivatives of these compounds in which at least one of the halogen atoms substituted at the 4-position is substituted at the 3-position.

Specific examples of the compounds having Formula (E) in which r is 1 include 4,4'-bis(4-chlorobenzoyl)diphenyl ether, 4,4'-bis(4-chlorobenzoylamino)diphenyl ether, 4,4'-bis(4-chlorophenylsulfonyl)diphenyl ether, 4,4'-bis(4-chlorophenyl)diphenyl ether dicarboxylate, 4,4'-bis[(4-chlorophenyl)-1,1,1,3,3,3-hexafluoropropyl] diphenyl ether, 4,4'-bis[(4-chlorophenyl)tetrafluoroethyl]diphenyl ether, derivatives of these compounds in which the chlorine atom is replaced by a bromine or an iodine atom, derivatives of these compounds in which the halogen substitution occurs at the 3-position in place of the 4-position, and derivatives of these compounds in which at least one of the substituents at the 4-position in the diphenyl ether is substituted at the 3-position.

The compounds having Formula (E) further include 2,2-bis[4-{4-(4-chlorobenzoyl)phenoxy}phenyl]-1,1,1,3,3,3-hexafluoropropane, bis[4-{4-(4-chlorobenzoyl)phenoxy}phenyl]sulfone, and compounds represented by the following formulae:

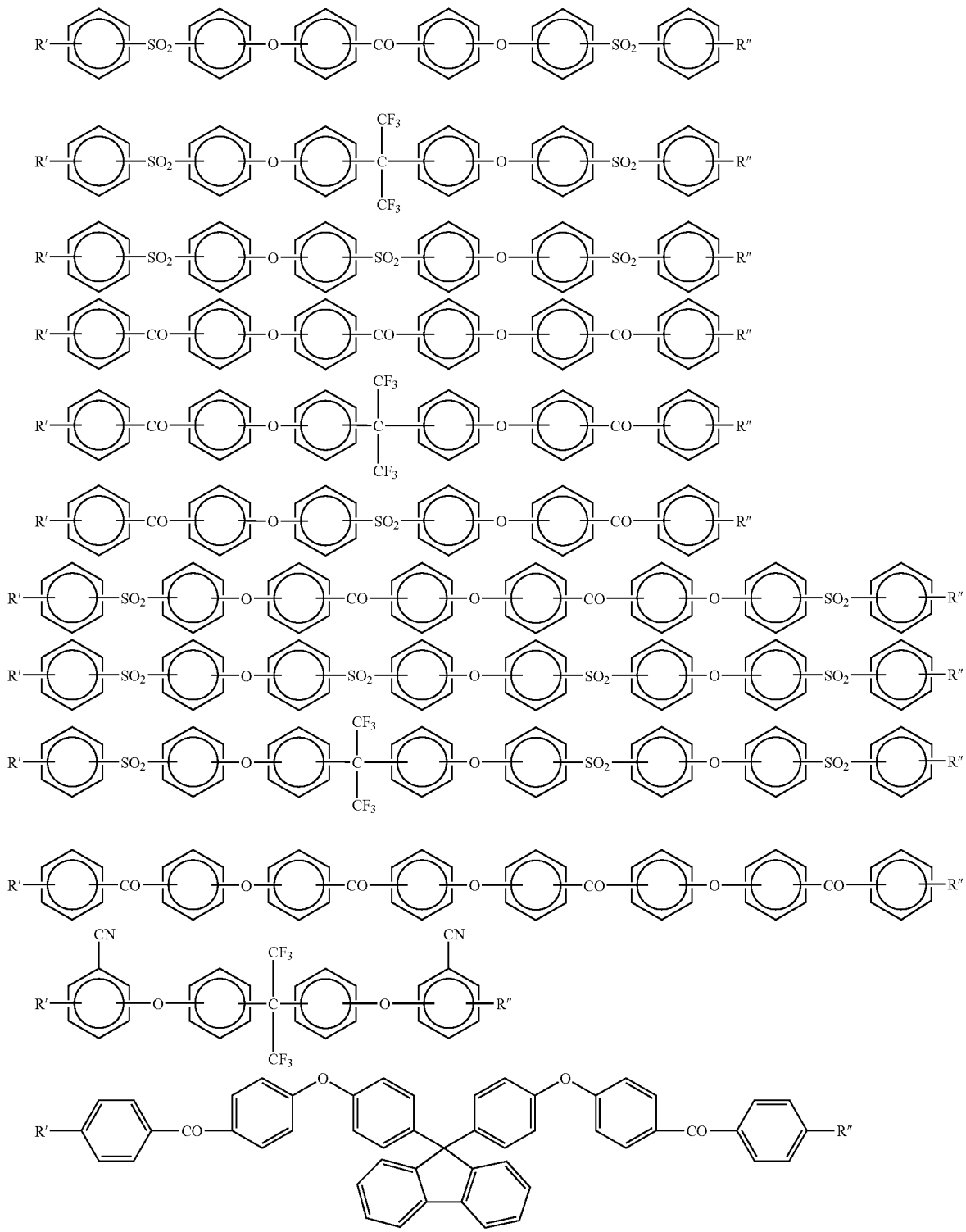

For example, the compounds represented by Formula (E) may be synthesized by the following process.

First, the bisphenols combined together by the electron-withdrawing groups are converted into an alkali metal salt of corresponding bisphenol by addition of an alkali metal such as lithium, sodium or potassium, or an alkali metal compound such as an alkali metal hydride, an alkali metal hydroxide or an alkali metal carbonate, in a polar solvent of high dielectric constant such as N-methyl-2-pyrrolidone, N,N-dimethylacetamide, sulfolane, diphenyl sulfone or dimethyl sulfoxide.

The alkali metal is generally used in slight excess over the hydroxyl groups of the bisphenol, for example 1.1 to 2 times, preferably 1.2 to 1.5 times the equivalent weight of the hydroxyl groups. Thereafter, the alkali metal salt of bisphenol is reacted with a halogen-substituted, e.g., fluorine- or chlorine-substituted, aromatic dihalide compound which has been activated by the electron-withdrawing groups, in the presence of a solvent that can form an azeotropic mixture with water, such as benzene, toluene, xylene, hexane, cyclohexane, octane, chlorobenzene, dioxane, tetrahydrofuran, anisole or phenetole. Examples of the aromatic dihalide compounds include 4,4'-difluorobenzophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone and 1,3-bis(4-chlorobenzoyl)benzene. From the viewpoint of reactivity, the aromatic dihalide compound is preferably a fluorine compound. But taking the subsequent aromatic coupling reaction into account, the aromatic nucleophilic substitution reaction should be designed to take place so as to yield a molecule having a chlorine atom at its end(s). The active aromatic dihalide compound may be used in an amount 2 to 4 times, preferably 2.2 to 2.8 times the moles of the bisphenol. The bisphenol may be formed into an alkali metal salt of bisphenol prior to the aromatic nucleophilic substitution reaction. The reaction temperature is in the range of 60 to 300° C., preferably 80 to 250° C. The reaction time ranges from 15 minutes to 100 hours, preferably from 1 to 24 hours. Optimally, the active aromatic dihalide compound is a chlorofluoro compound as shown in the formula below that has two halogen atoms different in reactivity from each other. The use of this compound is advantageous in that the fluorine atom preferentially undergoes the nucleophilic substitution reaction with phenoxide so that the objective chlorine-terminated active compound may be obtained.

Specifically, the aromatic bis-halide activated by the electron-withdrawing groups, such as bis(4-chlorophenyl)sulfone, is subjected to the nucleophilic substitution reaction with a phenol; thereafter the resultant bis-phenoxy compound is subjected to Friedel-Crafts reaction with, for example, 4-chlorobenzoyl chloride to give an objective compound. Examples of the aromatic bis-halides activated by the electron-withdrawing groups include the compounds described above. The phenol compound may be substituted, but is preferably unsubstituted from the viewpoints of heat resistance and flexibility. When substituted, the substituted phenol compound is preferably an alkali metal salt. Any of the alkali metal compounds mentioned above can be used for this purpose. The alkali metal compound may be used in an amount 1.2 to 2 times the mole of the phenol. In the reaction, the aforesaid polar solvent or the azeotropic solvent with water may be employed. In the Friedel-Crafts reaction, the bis-phenoxy compound is reacted with the acylating agent chlorobenzoyl chloride in the presence of a Friedel-Crafts reaction activator such as Lewis acid catalyst like aluminum chloride, boron trifluoride or zinc chloride. The chlorobenzoyl chloride is used in an amount 2 to 4 times, preferably 2.2 to 3 times the moles of the bis-phenoxy compound. The Friedel-Crafts reaction activator is used in an amount 1.1 to 2 times the moles of the active halide compound such as the acylating agent chlorobenzoic acid. The reaction time is in the range of 15 minutes to 10 hours, and the reaction temperature is in the range of −20 to 80° C. The solvent used herein may be chlorobenzene, nitrobenzene or the like that is inactive in the Friedel-crafts reaction.

The compounds of Formula (E) in which r is 2 or greater may be synthesized by polymerization in accordance with the above-mentioned procedure. In this case, a bisphenol such as 2,2-bis(4-hydroxyphenyl)-1,1,1,3,3,3-hexafluoropropane, 2,2-bis(4-hydroxyphenyl)ketone or 2,2-bis(4-hydroxyphenyl) sulfone is converted into an alkali metal salt of bisphenol

[Chem. 19]

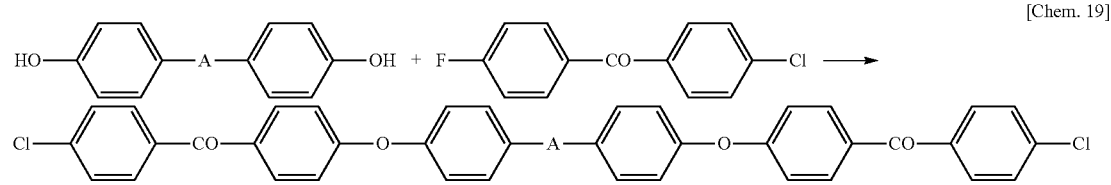

wherein A is as defined in Formula (E).

Alternatively, to produce the compounds of Formula (E), the nucleophilic substitution reaction may be carried out in combination with electrophilic substitution reaction to synthesize an objective flexible compound including the electron-withdrawing and electron-donating groups, as described in JP-A-H02-159.

and is subjected to substitution reaction with an excess of the activated aromatic halide such as 4,4-dichlorobenzophenone or bis(4-chlorophenyl)sulfone, in the presence of a polar solvent such as N-methyl-2-pyrrolidone, N,N-dimethylacetamide or sulfolane.

Examples of such compounds include those represented by the following formulae:

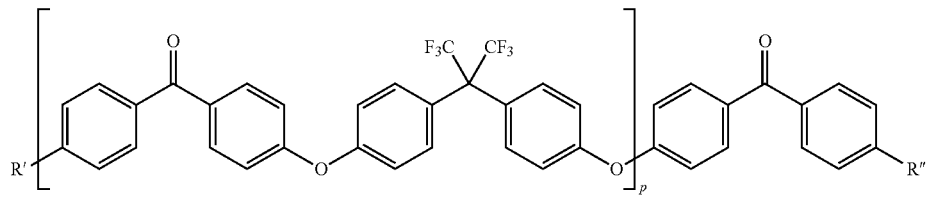

-continued
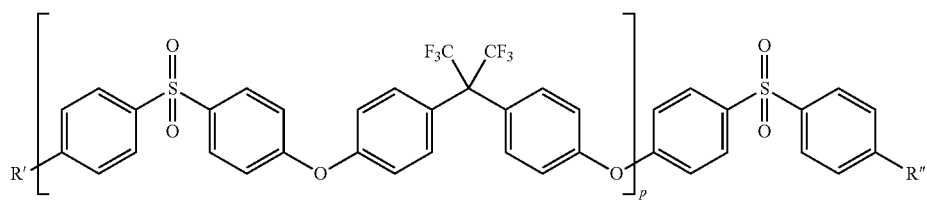
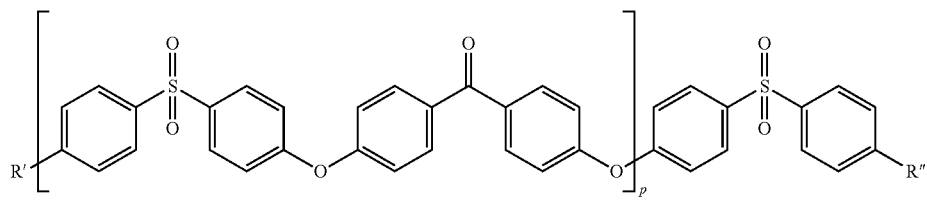
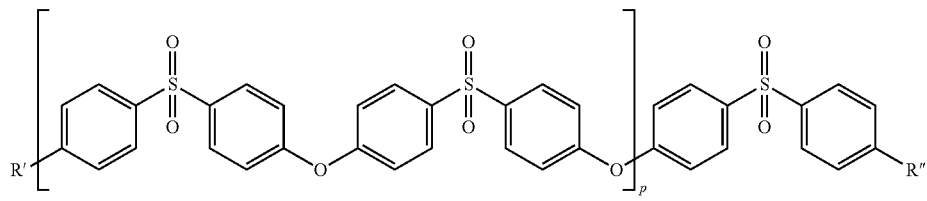
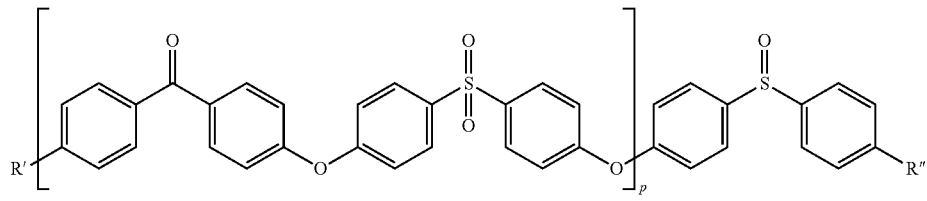
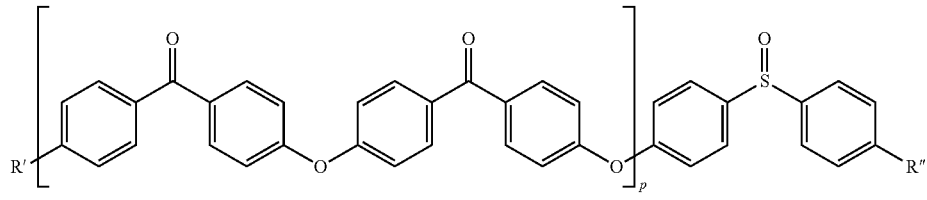
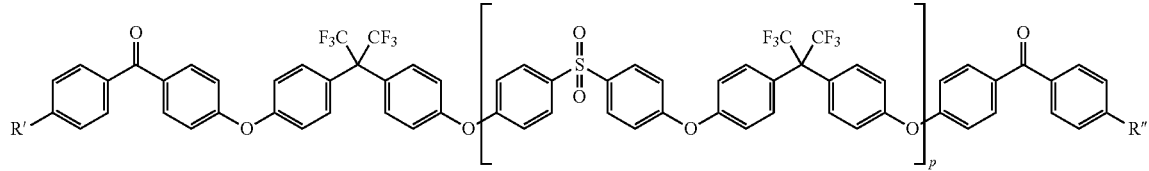
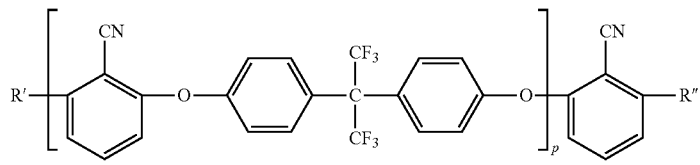
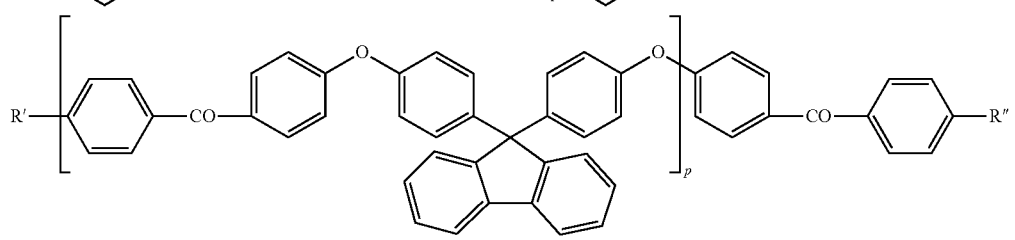

In the above formulae, p is 2 or a positive integer, generally up to 100, and is preferably from 10 to 80.

To synthesize the polyarylene having a sulfonate group that is represented by Formula (C), the monomer (D) and the oligomer (E) are reacted in the presence of a catalyst. The catalyst used herein is a catalyst system containing a transition metal compound. This catalyst system essentially contains (i) a transition metal salt and a compound which functions as a ligand (referred to as the "ligand component" hereinafter), or a transition metal complex (including a copper salt) to which ligands are coordinated, and (ii) a reducing agent. A "salt" may be added to increase the polymerization rate.

Examples of the transition metal salts include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Of these, nickel chloride and nickel bromide are particularly preferred.

Examples of the ligand components include triphenylphosphine, 2,2'-bipyridine, 1,5-cyclooctadiene and 1,3-bis(diphenylphosphino)propane. Of these, triphenylphosphine and 2,2'-bipyridine are preferred. The ligand components may be used singly or in combination of two or more kinds.

Examples of the transition metal complexes with coordinated ligands include nickel chloride-bis(triphenylphosphine), nickel bromide-bis(triphenylphosphine), nickel iodide-bis(triphenylphosphine), nickel nitrate-bis(triphenylphosphine), nickel chloride(2,2'-bipyridine), nickel bromide(2,2'-bipyridine), nickel iodide(2,2'-bipyridine), nickel nitrate(2,2'-bipyridine), bis(1,5-cyclooctadiene)nickel, tetrakis(triphenylphosphine)nickel, tetrakis(triphenylphosphito)nickel and tetrakis(triphenylphosphine)palladium. Of these, nickel chloride-bis(triphenylphosphine) and nickel chloride(2,2'-bipyridine) are preferred.

Examples of the reducing agents employable in the catalyst system include iron, zinc, manganese, aluminum, magnesium, sodium and calcium. Of these, zinc, magnesium and manganese are preferable. These reducing agents may be used in a more activated form by being contacted with an acid such as an organic acid.

Examples of the "salts" employable in the catalyst system include sodium compounds such as sodium fluoride, sodium chloride, sodium bromide, sodium iodide and sodium sulfate; potassium compounds such as potassium fluoride, potassium chloride, potassium bromide, potassium iodide and potassium sulfate; and ammonium compounds such as tetraethylammonium fluoride, tetraethylammonium chloride, tetraethylammonium bromide, tetraethylammonium iodide and tetraethylammonium sulfate. Of these, sodium bromide, sodium iodide, potassium bromide, tetraethylammonium bromide and tetraethylammonium iodide are preferred.

The transition metal salt or the transition metal complex is usually used in an amount of 0.0001 to 10 mol, preferably 0.01 to 0.5 mol per mol of the total of the monomers (total of the monomer (D) and the oligomer (E), the same applies hereinafter). If the amount is less than 0.0001 mol, the polymerization may not proceed sufficiently. The amount exceeding 10 mol may result in a lowered molecular weight.

When the catalyst system contains the transition metal salt and the ligand component, the ligand component usually has an amount of 0.1 to 100 mol, preferably 1 to 10 mol per mol of the transition metal salt. If the amount is less than 0.1 mol, the catalytic activity may become insufficient. The amount exceeding 100 mol may result in a lowered molecular weight.

The amount of the reducing agent is usually in the range of 0.1 to 100 mol, preferably 1 to 10 mol per mol of the total of the monomers. If the reducing agent is used in an amount less than 0.1 mol, the polymerization may not proceed sufficiently. The amount thereof exceeding 100 mol may make purification of the resulting polymer difficult.

When the "salt" is used, the amount thereof is usually 0.001 to 100 mol, preferably 0.01 to 1 mol per mol of the total of the monomers. If the salt is used in an amount less than 0.001 mol, the effect of increasing the polymerization rate is often insufficient. The amount thereof exceeding 100 mol may result in difficult purification of the resulting polymer.

Suitable polymerization solvents for use in the reaction between the monomer (D) and the oligomer (E) include tetrahydrofuran, cyclohexanone, dimethyl sulfoxide, N,N-dimethylformamide, N,N-dimethylacetamide, N-methyl-2-pyrrolidone, γ-butyrolactone and N,N'-dimethylimidazolidinone. Of these, tetrahydrofuran, N,N-dimethylformamide, N,N-dimethylacetamide, N-methyl-2-pyrrolidone and N,N'-dimethylimidazolidinone are preferred. These polymerization solvents are desirably used after dried sufficiently.

The concentration of all the monomers combined in the polymerization solvent is usually in the range of 1 to 90% by weight, preferably 5 to 40% by weight.

The polymerization temperature generally ranges from 0 to 200° C., preferably from 50 to 120° C. The polymerization time is usually in the range of 0.5 to 100 hours, preferably 1 to 40 hours.

The polyarylene with a sulfonate group obtained using the monomer (D) is subjected to hydrolysis to convert the sulfonate group into the sulfonic acid group, thereby obtaining the polyarylene having a sulfonic acid group.

For example, the hydrolysis may be performed by any of the following methods:

(1) The polyarylene with a sulfonate group is added to an excess of water or an alcohol that contains a little hydrochloric acid, and the mixture is stirred for at least 5 minutes.

(2) The polyarylene with a sulfonate group is reacted in trifluoroacetic acid at about 80 to 120° C. for about 5 to 10 hours.

(3) The polyarylene with a sulfonate group is reacted in a solution such as N-methylpyrrolidone that contains lithium bromide in an amount 1 to 3 times the moles of the sulfonate groups ($—SO_3R$) of the polyarylene, at about 80 to 150° C. for about 3 to 10 hours, followed by addition of hydrochloric acid.

Alternatively, the polyarylene having a sulfonic acid group may be obtained by copolymerizing a monomer having a skeleton similar to that of the sulfonate of Formula (D) except having no sulfonate groups with the oligomer of Formula (E), and sulfonating the thus-synthesized polyarylene. Specifically, a polyarylene having no sulfonic acid group is produced as described above and is treated with a sulfonating agent to introduce the sulfonic acid group in the polyarylene. The polyarylene having a sulfonic acid group may be thus obtained.

The sulfonation may be performed by treating the polyarylene having no sulfonic acid group with a sulfonating agent in the absence or presence of a solvent by a common method, whereby the sulfonic acid group is introduced in the polymer.

For introduction of the sulfonic acid groups, the polyarylene having no sulfonic acid group may be sulfonated with a known sulfonating agent such as sulfuric anhydride, fuming sulfuric acid, chlorosulfonic acid, sulfuric acid or sodium bisulfite, under known conditions.

Polymer Preprints, Japan, vol. 42, No. 3, p. 730 (1993)
Polymer Preprints, Japan, vol. 43, No. 3, p. 736 (1994)
Polymer Preprints, Japan, vol. 42, No. 7, pp. 2490-2492 (1993)

Specifically, the polyarylene having no sulfonic acid group is reacted with the sulfonating agent in the absence or presence of a solvent. The solvents used herein include hydrocarbon solvents such as n-hexane; ether solvents such as tetrahydrofuran and dioxane; aprotic polar solvents such as dimethylacetamide, dimethylformamide and dimethyl sulfoxide; and halogenated hydrocarbons such as tetrachloroethane, dichloroethane, chloroform and methylene chloride. The reaction temperature is not particularly limited, but is usually in the range of −50 to 200° C., preferably −10 to 100° C. The reaction time is usually from 0.5 to 1,000 hours, preferably from 1 to 200 hours.

The thus-produced polyarylene (C) having a sulfonic acid group will generally contain the sulfonic acid groups in an amount of 0.3 to 5 meq/g, preferably 0.5 to 3 meq/g, more preferably 0.8 to 2.8 meq/g. If the content of sulfonic acid groups is less than 0.3 meq/g, the proton conductivity will not reach a practical level. When it exceeds 5 meq/g, water resistance will be drastically deteriorated.

The content of sulfonic acid groups may be controlled by changing the types, amounts and combinations of the monomer (D) and the oligomer (E).

The polyarylene having a sulfonic acid group has a weight-average molecular weight in terms of polystyrene of 10,000 to 1,000,000, preferably 20,000 to 800,000, as measured by gel permeation chromatography (GPC).

The proton conductive membrane obtained from the sulfonic acid-containing polyarylene absorbs water when it is soaked in 90° C. water for 30 minutes of which the quantity of water showing melting temperatures in the range of −30 to 0° C. is 0.01 to 3.0 g, preferably 0.1 to 2.0 g based on 1 g of the copolymer.

In the proton conductive membrane obtained from the sulfonic acid-containing polyarylene, the copolymer making up the membrane has a morphology in which the segment (A) forms a continuous phase, preferably an isotropic continuous phase. Also preferably, the segment (B) forms a non-continuous phase, more preferably a structure similar to a dispersed phase.

The polyarylene having a sulfonic acid group capable of producing a proton conductive membrane which absorbs water when it is soaked in 90° C. water for 30 minutes of which the quantity of water showing melting temperatures in the range of −30 to 0° C. is 0.01 to 3.0 g based on 1 g of the polymer, may be prepared as described below. The polyarylene having a sulfonic acid group capable of producing a proton conductive membrane in which the segment (A) forms a continuous phase may be prepared as described below. The polyarylene having a sulfonic acid group capable of producing a proton conductive membrane in which the segment (A) forms an isotropic continuous phase may be prepared as described below. The polyarylene having a sulfonic acid group capable of producing a proton conductive membrane in which the segment (B) forms a non-continuous phase may be prepared as described below. The polyarylene having a sulfonic acid group capable of producing a proton conductive membrane in which the segment (B) forms a structure similar to a dispersed phase may be prepared as described below.

The polyarylene having a sulfonic acid group is preferably a block copolymer in which the repeating structural units represented by Formulae (A) and (B) are covalently bound.

The polyarylene having a sulfonic acid group may contain an anti-aging agent, preferably a hindered phenol compound with a molecular weight of not less than 500. Such anti-aging agents provide higher durability of the electrolyte.

The hindered phenol compounds employable in the invention include triethylene glycol-bis[3-(3-t-butyl-5-methyl-4-hydroxyphenyl)propionate] (trade name: IRGANOX 245), 1,6-hexanediol-bis[3-(3,5-di-t-butyl-4-hydroxyphenyl)propionate] (trade name: IRGANOX 259), 2,4-bis-(n-octylthio)-6-(4-hydroxy-3,5-di-t-butylanilino)-3,5-triadine (trade name: IRGANOX 565), pentaerythrithyl-tetrakis[3-(3,5-di-t-butyl-4-hydroxyphenyl) propionate] (trade name: IRGANOX 1010), 2,2-thio-diethylene-bis[3-(3,5-di-t-butyl-4-hydroxyphenyl) propionate] (trade name: IRGANOX 1035), octadecyl-3-(3,5-di-t-butyl-4-hydroxyphenyl)propionate) (trade name: IRGANOX 1076), N,N-hexamethylenebis(3,5-di-t-butyl-4-hydroxy-hydrocinnamide) (trade name: IRGANOX 1098), 1,3,5-trimethyl-2,4,6-tris(3,5-di-t-butyl-4-hydroxybenzyl) benzene (trade name: IRGANOX 1330), tris-(3,5-di-t-butyl-4-hydroxybenzyl)-isocyanurate (trade name: IRGANOX 3114) and 3,9-bis[2-[3-(3-t-butyl-4-hydroxy-5-methylphenyl)propionyloxy]-1,1-dimethylethyl]-2,4,8,10-tetraoxaspiro[5.5]undecane (trade name: Sumilizer GA-80).

The hindered phenol compound may preferably be used in an amount of 0.01 to 10 parts by weight based on 100 parts by weight of the polyarylene having a sulfonic acid group.

(Proton Conductive Membrane)

To produce the proton conductive membrane from the copolymer of the segments (A) and (B), a composition of the copolymer and an organic solvent may be prepared, and the composition may be cast on a substrate to form a film (casting method).

In addition to the copolymer of the segments (A) and (B) and organic solvent, the composition may contain inorganic acids such as sulfuric and phosphoric acids, organic acids including carboxylic acids, an appropriate amount of water, and the like.

Although the polymer concentration in the composition depends on the molecular weight of the copolymer of the segments (A) and (B), it is generally from 5 to 40% by weight, preferably from 7 to 25% by weight. The polymer concentration less than 5% by weight causes difficulties in producing the membrane in large thickness and results in easy occurrence of pinholes. On the other hand, when the polymer concentration exceeds 40% by weight, the solution viscosity becomes so high that the film production is difficult and the surface smoothness is often poor.

The solution viscosity of the composition may vary depending on the molecular weight of the copolymer and the polymer concentration. Generally, it ranges from 2,000 to 100,000 mPa·s, preferably from 3,000 to 50,000 mPa·s. When the viscosity is less than 2,000 mPa·s, the solution will have too high a fluidity and may spill out of the substrate during the membrane production. The viscosity exceeding 100,000 mPa·s is so high that the solution cannot be extruded through a die and the film-casting is often difficult.

The composition may be prepared by mixing the aforesaid components in a predetermined ratio by conventional methods, for example by mixing with a mixer such as a wave rotor, a homogenizer, a disperser, a paint conditioner or a ball mill.

Examples of the organic solvents include methanol, ethanol, 1-propanol, 2-propanol, n-butyl alcohol, 2-methyl-1-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, cyclohexanol, dicyclohexanol, 1-hexanol, 2-methyl-1-pentanol, 2-methyl-2-pentanol, 4-methyl-2-pentanol, 2-ethyl-1-butanol, 1-methylcyclohexanol, 2-methylcyclohexanol, 3-methylcyclohexanol, 4-methylcyclohexanol, 1-octanol, 2-octanol, 2-ethyl-1- hexanol, ethylene glycol, propylene glycol, 1,3-butanediol, glycerol, m-cresol, diethyleneglycol, dipropylene glycol, ethyl lactate, n-butyl lactate, diacetone alcohol, dioxane, butyl ether, phenyl ether, isopentyl ether, dimethoxyethane, diethoxyethane, bis(2-methoxyethyl)ether, bis(2-ethoxyethyl)ether, cineol, benzyl ethyl ether, furan, tetrahydrofuran, anisole, phenetole, acetal, acetone, methyl ethyl ketone, 2-pentanone, 3-pentanone, cyclopentanone, cyclohexanone, 2-hexanone, 4-methyl-2-pentanone, 2-heptanone, 2,4-dimethyl-3-pentanone, 2-octanone, acetophenone, mesityl oxide, benzaldehyde, ethyl acetate, n-butyl acetate, isobutyl acetate, sec-butyl acetate, isoamyl acetate, pentyl acetate, isopentyl acetate, 3-methoxybutyl acetate, methyl butyrate, ethyl butyrate, methyl lactate, ethyl lactate, butyl lactate, γ-butyrolactone, 2-methoxyethanol, 2-ethoxyethanol, 2-(methoxymethoxy)ethanol, 2-isopropoxyethanol, 1-methoxy-2-propanol, 1-ethoxy-2-propanol, dimethyldiethylene glycol, dimethyl sulfoxide, dimethyl sulfone, diethyl sulfide, acetonitrile, butyronitrile, nitromethane, nitroethane, 2-nitropropane, nitrobenzene, benzene, toluene, xylene, hexane, cyclohexane, dimethylacetamide, dimethylformamide, N-methyl-2-pyrrolidone, dimethylsulfoxide, tetramethylurea and 1,3-dimethyl-2-imidazolidinone. These organic solvents may be used singly, or they may be used in combination, in which case preferably at least one of the organic solvents contains at least one group selected from —O—, —OH, —CO—, —SO$_2$—, —SO$_3$—, —CN and —CO$_2$—.

The substrate used herein may be a polyethyleneterephthalate (PET) film, but is not limited thereto. Any substrates commonly used in the solution casting methods may be employed. Examples include, but not particularly limited to, plastic substrates and metal substrates.

The film produced by the casting method is dried at 30 to 160° C., preferably 50 to 150° C., for 3 to 180 minutes, preferably 5 to 120 minutes. Consequently, a film (proton conductive membrane) is obtained. The dry thickness is generally from 10 to 100 μm, preferably 20 to 80 μm. When the solvent remains in the membrane after the drying, it may be removed by extraction with water as required.

In addition to the polymer of the segments (A) and (B), the proton conductive membrane may contain inorganic acids such as sulfuric and phosphoric acids, organic acids including carboxylic acids, an appropriate amount of water, and the like.

The proton conductive membrane may be used as electrolytes for primary and secondary batteries, as proton conductive membranes for display elements, sensors, signaling media and solid condensers, and as ion exchange membranes.

EXAMPLES

The present invention will be hereinafter described in greater detail by Examples presented below, but it should be construed that the invention is in no way limited to those Examples.

In Examples, the sulfonic acid equivalent, molecular weight, and proton conductivity were determined as described below.

1. Sulfonic Acid Equivalent

The polymer having a sulfonic acid group was washed until the washings became neutral, and free residual acids were removed. The polymer was sufficiently washed with water and dried. A predetermined amount of the polymer was weighed out and dissolved in a THF/water mixed solvent. The resultant solution was mixed with phenolphthalein as an indicator, and the mixture was titrated with a NaOH standard solution to obtain a point of neutralization, from which the sulfonic acid equivalent was determined.

2. Measurement of Molecular Weight

The polyarylene having no sulfonic acid group was analyzed by GPC using tetrahydrofuran (THF) as a solvent to determine the weight-average molecular weight in terms of polystyrene. The polyarylene having a sulfonic acid group was analyzed by GPC using an eluting solution consisted of N-methyl-2-pyrrolidone (NMP) mixed with solvents lithium bromide and phosphoric acid, to determine the molecular weight in terms of polystyrene.

3. Measurement of Quantity of Water Showing Melting Temperatures of −30 to 0° C.

The proton conductive membrane was soaked in 90° C. water for 30 minutes and taken out. The membrane was cooled to −100° C. and then heated to 200° C. each at 5° C./min using a differential scanning calorimeter (Thermal Analyst 2000 manufactured by DuPont Instruments). The areas of the peaks due to the melting of water were obtained to determine the heat of melting, and the quantity of water showing melting temperatures in the range of −30 to 0° C. per g of the polymer was obtained. (Quantity of water showing melting temperatures of −30 to 0° C. per g of the polymer (g/g))=(Heat of melting of water at −30 to 0° C. (J)/Heat of melting of water (J/g))/Weight after measurement (g)

4. Measurement of Proton Conductivity

A 5 mm wide strip specimen of the proton conductive membrane, holding five platinum wires (f=0.5 mm) at intervals of 5 mm on its surface, was placed in a thermo-hygrostat. The alternating current impedance between the platinum wires was measured at 10 kHz under the conditions of 85° C. and 45% RH and under the conditions of temperatures of 25° C., 5° C., 0° C., −10° C. and −20° C. and 50% RH. This measurement was carried out using a chemical impedance measuring system (NF Corporation) and thermo-hygrostat JW241 (Yamato Science Co., Ltd.). The alternating current resistance was measured in each case where the interwire distance was changed from 5 mm to 20 mm among the five platinum wires. The resistivity of the membrane was calculated from a gradient between the interwire distance and the resistance. The reciprocal number of resistivity was obtained as alternating current impedance, from which the proton conductivity was calculated.

Resistivity R (Ω·cm)=0.5 (cm)×membrane thickness (cm)×resistance/interwire distance gradient (Ω/cm)

Synthetic Example 1

(Preparation of Oligomer)

A 1-L three-necked flask equipped with a stirrer, a thermometer, a cooling tube, a Dean-Stark tube and a three-way nitrogen inlet tube, was charged with 67.3 g (0.20 mol) of 2,2-bis(4-hydroxyphenyl)-1,1,1,3,3,3-hexafluoropropane (bisphenol AF), 60.3 g (0.24 mol) of 4,4'-dichlorobenzophenone (4,4'-DCBP), 71.9 g (0.52 mol) of potassium carbonate, 300 ml of N,N-dimethylacetamide (DMAc) and 150 ml of toluene. With the flask in an oil bath, the materials were reacted by being stirred in a nitrogen atmosphere at 130° C. The reaction was carried out while water resulting from the reaction was formed into an azeotropic mixture with toluene and was removed outside the system through the Dean-Stark tube. Water almost ceased to occur after about 3 hours, and most of the toluene was removed while gradually raising the reaction temperature from 130° C. to 150° C. The reaction was continuously performed at 150° C. for 10 hours, and 10.0 g (0.040 mol) of 4,4'-DCBP was added to carry out the reaction for another 5 hours. The reaction liquid was cooled naturally and was filtered to remove precipitated by-product inorganic compounds. The filtrate was poured into 4 L of methanol to precipitate the product. The precipitated product was filtered off, dried and dissolved in 300 ml of tetrahydrofuran. The resultant solution was poured into 4 L of methanol to perform reprecipitation. Consequently, 95 g of an objective compound was obtained (85% yield).

GPC (THF solvent) showed that the polymer had a weight-average molecular weight of 11,200 in terms of polystyrene. The polymer was found to be soluble in THF, NMP, DMAc and sulfolane, and to have Tg of 110° C. and a thermal decomposition temperature of 498° C.

The compound obtained was identified to be an oligomer represented by Formula (I) (hereinafter, the BCPAF oligomer)

tated in large excess (1500 ml) of methanol. The precipitated product was air dried and then heat dried to give 47.0 g (99% yield) of an objective yellow fibrous copolymer including a neopentyl-protected sulfonic acid derivative. GPC resulted in Mn of 47,600 and Mw of 159,000.

A 5.1 g portion of the copolymer including a neopentyl-protected sulfonic acid derivative was dissolved in 60 ml of NMP, followed by heating to 90° C. To the reaction system, a mixture consisting of 50 ml of methanol and 8 ml of concentrated hydrochloric acid was added all at once. Reaction was carried out under mild reflux conditions for 10 hours while maintaining a suspension state. Excess methanol was evaporated using a distillation apparatus equipped, and a light green transparent solution resulted. The solution was poured into an excess of water/methanol (1:1 by weight) to precipitate the polymer. The polymer was washed with ion exchange water until the pH of the washings became not less than 6. IR

[Chem. 21]

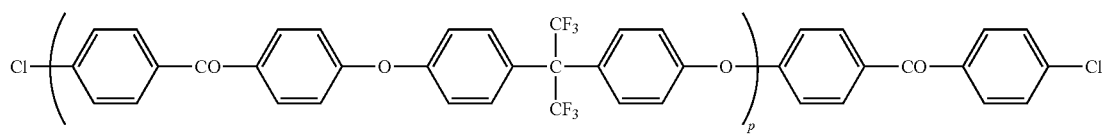

(I)

Synthetic Example 2

Preparation of Neopentyl-Protected Polyarylene Copolymer

A 1-L three-necked flask equipped with a stirrer, a thermometer, a cooling tube, a Dean-Stark tube and a three-way nitrogen inlet tube, was charged, in a nitrogen atmosphere, with 39.58 g (98.64 mmol) of neo-pentyl 3-(2,5-dichlorobenzoyl)benzenesulfonate, 15.23 g (1.36 mmol) of the BCPAF oligomer (Mn=11,200), 1.67 g (2.55 mmol) of Ni(PPh$_3$)$_2$Cl$_2$, spectroscopy and quantitative analysis for ion exchange capacity showed that the sulfonate groups (—SO$_3$R) had been quantitatively converted to the sulfonic acid groups (—SO$_3$H). The polymer had a structure represented by Formula (II) below.

GPC for the polyarylene having a sulfonic acid group resulted in Mn of 53,200 and Mw of 185,000. The sulfonic acid equivalent was 1.9 meq/g.

[Chem. 22]

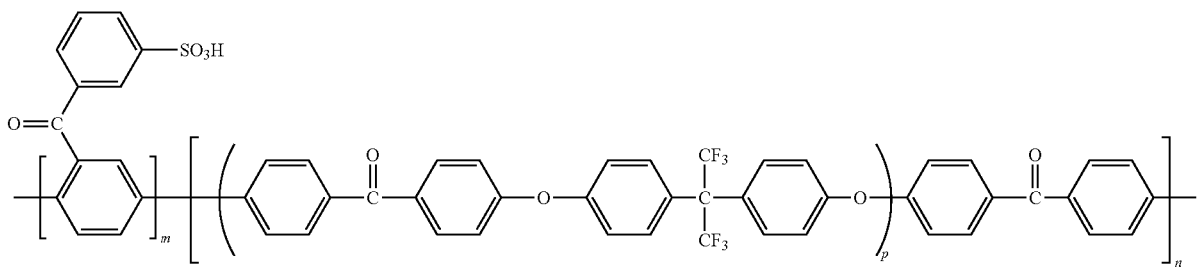

(II)

10.49 g (40 mmol) of PPh$_3$, 0.45 g (3 mmol) of NaI, 15.69 g (240 mmol) of zinc powder and 390 ml of dry NMP. The reaction system was heated (finally to 75° C.) with stirring to perform reaction for 3 hours. The polymerization solution was diluted with 250 ml of THF, stirred for 30 minutes, and filtered with use of Celite as a filter aid. The filtrate was poured into large excess (1500 ml) of methanol to precipitate the product. The precipitated product was filtered off, air dried, redissolved in THF/NMP (200/300 ml) and precipi-

Synthetic Example 3

(Preparation of Oligomer)

The procedures of Synthetic Example 1 were repeated, except that the reaction involved 103.7 g (0.48 mol) of 4,4'-dihydroxybenzophenone (4,4'-DHBP), 148.2 g (0.52 mol) of 4,4'-dichlorodiphenylsulfone (4,4'-DCDS), 86.9 g (0.63 mol) of potassium carbonate, 500 ml of 1,3-dimethyl-2-imidazolidinone (DMI) and 200 ml of toluene. Consequently, 180 g of an objective compound was obtained (78% yield).

GPC (THF solvent) showed that the polymer had a number-average molecular weight of 13,700 in terms of polystyrene. The polymer was found to be soluble in NMP, DMAc and DMI, and to have Tg of 159° C. and a thermal decomposition temperature of 500° C.

The compound obtained was assumed to be an oligomer represented by Formula (III) (hereinafter, the oligomer C):

ing tube, was charged with 48.8 g (284 mmol) of 2,6-dichlorobenzonitrile, 89.5 g (266 mmol) of 2,2-bis(4-hydroxyphenyl)-1,1,1,3,3,3-hexafluoropropane, and 47.8 g (346 mmol) of potassium carbonate. After the flask had been purged with nitrogen, 346 ml of sulfolane and 173 ml of toluene were added, followed by stirring. The reaction liquid was heated at 150° C. under reflux in an oil bath. Water resulting from the reaction was trapped in the Dean-Stark

[Chem. 23]

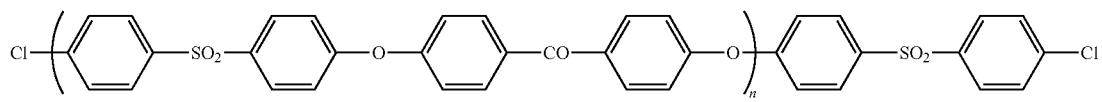

(III)

Synthetic Example 4

(Preparation of Neopentyl-Protected Polyarylene Copolymer)

The polymerization and post treatment of Synthetic Example 2 were repeated, except that the BCPAF oligomer (Mn=11,200) was replaced by the oligomer C (Mn=13,700) obtained in Synthetic Example 3.

The neopentyl-protected polyarylene copolymer (PolyAC-SO$_3$neo-Pe) produced was subjected to deprotection reaction as described in Synthetic Example 2. IR spectroscopy and quantitative analysis for ion exchange capacity showed that the sulfonate groups (—SO$_3$R) had been quantitatively converted to the sulfonic acid groups (—SO$_3$H). The polymer had a structure represented by Formula (IV) below.

GPC for the polyarylene having a sulfonic acid group resulted in Mn of 55,200 and Mw of 188,000. The sulfonic acid equivalent was 1.9 meq/g.

tube. Water almost ceased to occur after 3 hours, and the toluene was removed outside the reaction system through the Dean-Stark tube. The reaction temperature was slowly raised to 200° C. and stirring was performed for 3 hours. Thereafter, 9.2 g (53 mmol) of 2,6-dichlorobenzonitrile was added to carry out the reaction for another 5 hours.

The reaction liquid was cooled naturally, diluted with 100 ml of toluene, and filtered to remove insoluble inorganic salts. The filtrate was poured into 2 L of methanol to precipitate the product. The precipitated product was filtered off, dried and dissolved in 250 ml of tetrahydrofuran. The resultant solution was poured into 2 L of methanol to perform reprecipitation. The precipitated white powder was filtered off and dried to

[Chem. 24]

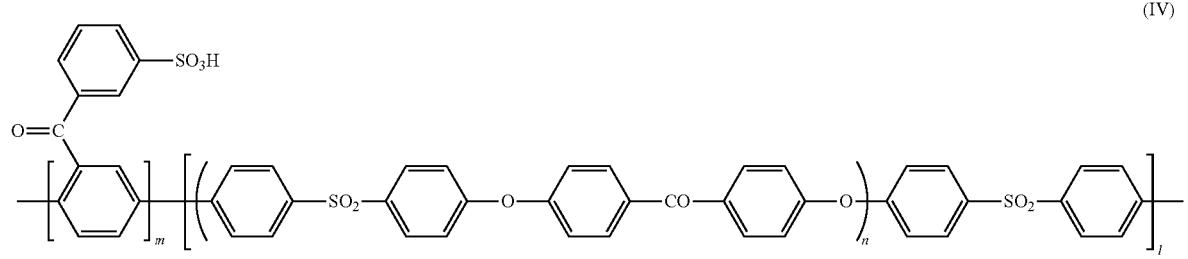

(IV)

Synthetic Example 5

(Preparation of Oligomer)

A 1-L three-necked flask equipped with a stirrer, a thermometer, a Dean-Stark tube, a nitrogen inlet tube and a coolyield 109 g of an objective product. GPC resulted in a number-average molecular weight (Mn) of 9,500.

The compound obtained was identified to be an oligomer represented by Formula (V):

[Chem. 25]

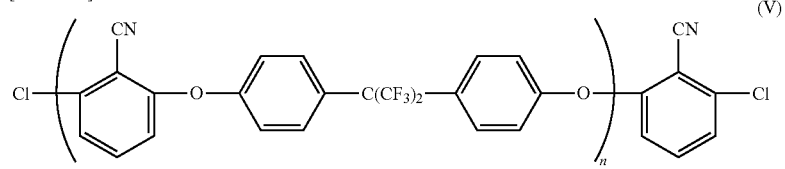

(V)

Synthetic Example 6

Synthesis of Sulfonated Polyarylene

A 1-L three-necked flask equipped with a stirrer, a thermometer and a nitrogen inlet tube was charged with 135.2 g (337 mmol) of neopentyl 3-(2,5-dichlorobenzoyl) benzenesulfonate, 48.7 g (5.1 mmol) of the oligomer of Formula (V) obtained in Synthetic Example 5 (Mn=9,500), 6.71 g (10.3 mmol) of bis(triphenylphosphine)nickel dichloride, 1.54 g (10.3 mmol) of sodium iodide, 35.9 g (137 mmol) of triphenylphosphine, and 53.7 g (821 mmol) of zinc. The flask was purged with dry nitrogen, and 430 ml of N,N-dimethylacetamide (DMAc) was added. The mixture was stirred for 3 hours while maintaining the reaction temperature at 80° C. The reaction liquid was diluted with 730 ml of DMAc, and insolubles were filtered out.

The solution obtained was introduced into a 2-L three-necked flask equipped with a stirrer, a thermometer and a nitrogen inlet tube, and was heated to 115° C. with stirring. Subsequently, 44 g (506 mmol) of lithium bromide was added. The mixture was stirred for 7 hours and was poured into 5 L of acetone to precipitate the product. The product was washed sequentially with 1N hydrochloric acid and pure water, and was dried to give 122 g of an objective polymer. The weight-average molecular weight (Mw) of the polymer was 135,000. The polymer obtained was assumed to be a sulfonated polymer represented by Formula (VI). The ion exchange capacity of the polymer was 2.3 meq/g.

[Chem. 26]

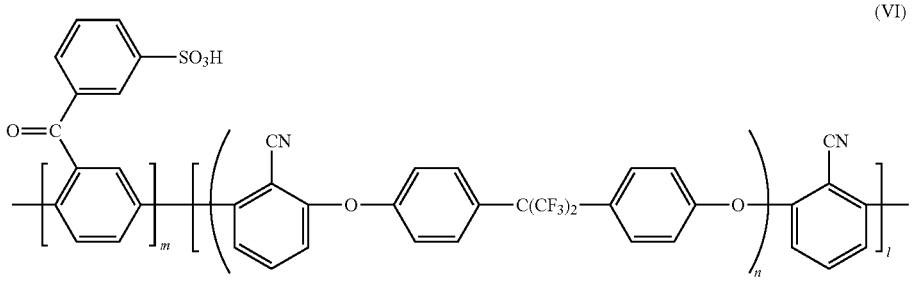

(VI)

Example 1

A 50-cc screw cap tube was charged with 4 g of the sulfonic acid-containing polyarylene obtained in Synthetic Example 2, 11.7 g of 1-methoxy-2-propanol, 8.8 g of toluene and 8.8 g of γ-butyrolactone, followed by stirring with a wave rotor for 24 hours. Consequently, a uniform polymer solution having a viscosity of 4,500 cp resulted.

The solution was cast on a PET film using a bar coater, and the coating was dried at 80° C. for 30 minutes and at 120° C. for 60 minutes to give a uniform and transparent solid electrolyte film A having a thickness of 40 μm. For observation of the internal structure of the film, an ultrathin piece was cut out from the film and was stained with lead nitrate. The piece was observed with transmission electron microscope (hereinafter TEM) HF-100FA manufactured by Hitachi, Ltd.

The TEM observation showed an isotropic microphase separated structure formed by domains of the segments (A) and domains of the segments (B). The domains of the segments (B) were similar to dispersed phases, and the domains of the segments (A) constituted matrixes and linked together to form a continuous network through the membrane. Analysis of the TEM picture with an image processing software (scion image) resulted in a long period of 25 nm. The quantity of water showing melting temperatures in the range of −30 to 0° C., and the proton conductivity of the proton conductive membrane are given in Tables 1 and 2.

Example 2

A 50-cc screw cap tube was charged with 4 g of the sulfonic acid-containing polyarylene obtained in Synthetic Example 2, 11.7 g of methanol and 17.6 g of N-methyl-2-pyrrolidone, followed by stirring with a wave rotor for 24 hours. Consequently, a uniform polymer solution having a viscosity of 4,000 cp resulted.

The solution was cast on a PET film using a bar coater, and the coating was dried at 80° C. for 30 minutes and at 140° C. for 60 minutes to give a uniform and transparent solid electrolyte film C having a thickness of 40 μm. For observation of the internal structure of the film, an ultrathin piece was cut out from the film and was stained with lead nitrate. The piece was observed with TEM.

The TEM observation showed an isotropic microphase separated structure formed by domains of the segments (A) and domains of the segments (B). The domains of the segments (A) and domains of the segments (B) formed a structure similar to a co-continuous structure. Analysis of the TEM picture with an image processing software (scion image) resulted in a long period of 29 nm.

The quantity of water showing melting temperatures in the range of −30 to 0° C., and the proton conductivity of the proton conductive membrane are given in Tables 1 and 2.

Example 3

A 50-cc screw cap tube was charged with 4 g of the sulfonic acid-containing polyarylene obtained in Synthetic Example 6, 14.4 g of methanol and 21.6 g of N-methyl-2-pyrrolidone, followed by stirring with a wave rotor for 24 hours. Consequently, a uniform polymer solution having a viscosity of 4,000 cp resulted.

The solution was cast on a PET film using a bar coater, and the coating was dried at 80° C. for 30 minutes and at 140° C. for 60 minutes to give a uniform and transparent solid electrolyte film C having a thickness of 40 μm. For observation of the internal structure of the film, an ultrathin piece was cut out from the film and was stained with lead nitrate. The piece was observed with TEM.

The TEM observation showed an isotropic microphase separated structure formed by domains of the segments (A) and domains of the segments (B). The domains of the segments (A) and domains of the segments (B) formed a structure similar to a co-continuous structure. Analysis of the TEM picture with an image processing software (scion image) resulted in a long period of 20 nm.

The quantity of water showing melting temperatures in the range of −30 to 0° C., and the proton conductivity of the proton conductive membrane are given in Tables 1 and 2.

Comparative Example 1

A 50-cc screw cap tube was charged with 4 g of the sulfonic acid-containing polyarylene obtained in Synthetic Example 4, 11.7 g of methanol and 17.6 g of N-methyl-2-pyrrolidone, followed by stirring with a wave rotor for 24 hours. Consequently, a uniform polymer solution having a viscosity of 4,300 cp resulted.

The solution was cast on a PET film using a bar coater, and the coating was dried at 80° C. for 30 minutes and at 140° C. for 60 minutes to give a uniform and transparent solid electrolyte film C having a thickness of 39 μm. For observation of the internal structure of the film, an ultrathin piece was cut out from the film and was stained with lead nitrate. The piece was observed with TEM.

The TEM observation showed a microphase separated structure formed by domains of the segments (A) and domains of the segments (B). The domains of the segments (B) formed continuous phases enclosing the domains of the segments (A), so that the domains of the segments (A) were non-continuous phases. Analysis of the TEM picture with an image processing software (scion image) resulted in a long period of 50 nm.

The quantity of water showing melting temperatures in the range of −30 to 0° C., and the proton conductivity of the proton conductive membrane are given in Tables 1 and 2.

wherein the ion nonconductive polymer segment (B) has a structure in which main chain skeletons of the ion nonconductive polymer segment (B) are covalently bound at aromatic rings thereof through binding groups, and wherein the proton conductive membrane has a morphology in which the ion conductive polymer segment (A) forms a continuous phase, and wherein the proton conductive membrane comprises a block copolymer in which the ion conductive polymer segment (A) and the ion nonconductive polymer segment (B) are covalently bound.

2. The proton conductive membrane according to claim 1, wherein the ion conductive polymer segment (A) and the ion nonconductive polymer segment (B) comprise repeating structural units represented by Formulae (A) and (B), respectively:

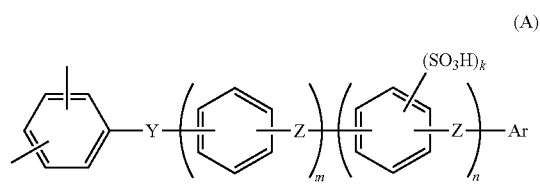

(A)

wherein Y is a divalent electron-withdrawing group; Z is a divalent electron-donating group or a direct bond; Ar is an aromatic group having a substituent —SO$_3$H; m is an integer ranging from 0 to 10; n is an integer ranging from 0 to 10; and k is an integer ranging from 1 to 4;

TABLE 1

| | Polymer | Weight ratio of solvents (%) | Quantity of water showing melting temperatures of −30 to 0° C. (g/g) |
|---|---|---|---|
| Ex. 1 | Syn. Ex. 2 | 1-methoxy-2-propanol/toluene/γ-butyrolactone (40/30/30) | 0.83 |
| Ex. 2 | Syn. Ex. 2 | methanol/N-methyl-2-pyrrolidone (40/60) | 0.48 |
| Ex. 3 | Syn. Ex. 6 | methanol/N-methyl-2-pyrrolidone (40/60) | 0.30 |
| Comp. Ex. 1 | Syn. Ex. 4 | Methanol/N-methyl-2-pyrrolidone (40/60) | 0.009 |

TABLE 2

| | Conductivity (S/cm) | | | | | |
|---|---|---|---|---|---|---|
| | 85° C./45% | 25° C./50% | 5° C./50% | 0° C./50% | −10° C./50% | −20° C./50% |
| Ex. 1 | 2.5 × 10$^{-2}$ | 1.7 × 10$^{-2}$ | 8.9 × 10$^{-3}$ | 9.1 × 10$^{-3}$ | 5.6 × 10$^{-3}$ | 3.8 × 10$^{-3}$ |
| Ex. 2 | 1.8 × 10$^{-2}$ | 1.1 × 10$^{-2}$ | 6.0 × 10$^{-3}$ | 5.7 × 10$^{-3}$ | 2.8 × 10$^{-3}$ | 1.7 × 10$^{-3}$ |
| Ex. 3 | 2.7 × 10$^{-2}$ | 1.8 × 10$^{-2}$ | 8.9 × 10$^{-3}$ | 9.2 × 10$^{-3}$ | 6.0 × 10$^{-3}$ | 4.1 × 10$^{-3}$ |
| Comp. Ex. 1 | 1.5 × 10$^{-3}$ | 9.0 × 10$^{-4}$ | 4.8 × 10$^{-4}$ | 4.4 × 10$^{-4}$ | 2.2 × 10$^{-4}$ | 1.4 × 10$^{-4}$ |

The invention claimed is:

1. A proton conductive membrane comprising an ion conductive polymer segment (A) which is polyarylene and an ion nonconductive polymer segment (B), the membrane absorbing water when it is soaked in 90° C. water for 30 minutes of which the quantity of water showing melting temperatures in the range of −30 to 0° C. is 0.1 to 2.0 g based on 1 g of the copolymer,

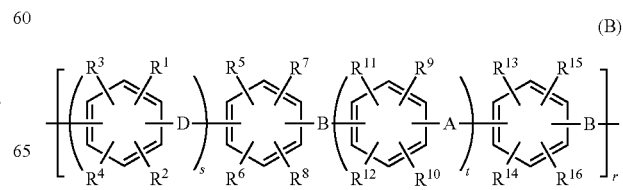

(B)

-continued

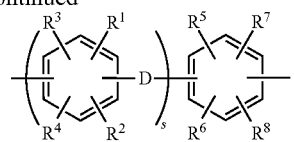

wherein E and D are the same or different and are each a direct bond or at least one structure selected from the group consisting of —CO—, —SO$_2$—, —SO—, —CONH—, —COO—, —(CF$_2$)$_l$— (wherein l is an integer ranging from 1 to 10), —(CH$_2$)$_l$— (wherein l is an integer ranging from 1 to 10), —C(R')$_2$— (wherein R' is an alkyl group, a fluoroalkyl group or an aryl group), —O—, —S—, a cyclohexylidene group and a fluorenylidene group; B's are the same or different and are each an oxygen or a sulfur atom; $R^1$ to $R^{16}$ are the same or different from one another and are each at least one atom or group selected from the group consisting of a hydrogen atom, a fluorine atom, alkyl groups, partially or fully halogenated alkyl groups, allyl groups, aryl groups, a nitro group and a nitrile group; s and t are the same or different and are each an integer ranging from 0 to 4; and r is an integer of 0 or 1 or greater.

* * * * *